(12) United States Patent
Tsukamoto et al.

(10) Patent No.: US 8,617,730 B2
(45) Date of Patent: Dec. 31, 2013

(54) BATTERY FOR ELECTRIC VEHICLE

(75) Inventors: Tomohiro Tsukamoto, Saitama (JP); Kazumi Shibata, Saitama (JP); Takashi Tominaga, Saitama (JP); Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 13/229,314

(22) Filed: Sep. 9, 2011

(65) Prior Publication Data
US 2012/0082881 A1   Apr. 5, 2012

(30) Foreign Application Priority Data

Sep. 30, 2010 (JP) ................................. 2010-222878
Sep. 30, 2010 (JP) ................................. 2010-222879

(51) Int. Cl.
*H01M 2/24* (2006.01)
*H01M 2/34* (2006.01)
*H01M 10/50* (2006.01)
*H01M 2/10* (2006.01)

(52) U.S. Cl.
USPC .................. 429/7; 429/61; 429/62; 429/120; 429/149

(58) Field of Classification Search
USPC .................. 429/7, 61, 62, 120, 149
See application file for complete search history.

(56) References Cited

U.S. PATENT DOCUMENTS

| | | | |
|---|---|---|---|
| 6,773,848 B1 * | 8/2004 | Nortoft et al. | 429/158 |
| 7,198,866 B2 * | 4/2007 | Miyamoto et al. | 429/149 |
| 7,504,178 B2 * | 3/2009 | Shimamura et al. | 429/159 |
| 2005/0122681 A1 | 6/2005 | Kitamura et al. | |
| 2006/0166086 A1 * | 7/2006 | Kato | 429/153 |
| 2007/0231682 A1 * | 10/2007 | Aoyama et al. | 429/160 |

FOREIGN PATENT DOCUMENTS

| JP | 2005-108693 A | 4/2005 |
|---|---|---|
| JP | 2005-174994 A | 6/2005 |
| JP | 2006-66895 A | 3/2006 |
| JP | 2006-182315 A | 7/2006 |
| JP | 2008-221976 A | 9/2008 |

* cited by examiner

*Primary Examiner* — Gregg Cantelmo
(74) *Attorney, Agent, or Firm* — Birch, Stewart, Kolasch & Birch, LLP

(57) ABSTRACT

A battery configured as a plurality of battery cells for an electric vehicle with one board for supplying electric power to an electric motor. Each battery cell is provided with positive and negative electrodes on the side of the board. The board is provided with a plurality of cell connecting parts for transmitting cell information of each battery cell corresponding to each electrode. Sensor wiring connects each electrode and each cell connecting part. Wiring is formed are arranged over the board that radiates heat via an insulating adhesive. A heating element is mounted on a first heat-conduction member formed on a top face of the uppermost wiring board. A second heat-conduction member is formed on the downside of the lowermost wiring board. The first heat-conduction member and the second heat-conduction member are touched via a third heat-conduction member arranged in a through hole bored through each wiring board.

20 Claims, 21 Drawing Sheets

BATTERY FOR ELECTRIC VEHICLE

CROSS-REFERENCE TO RELATED APPLICATIONS

The present application claims priority under 35 USC 119 to Japanese Patent Application Nos. 2010-222878 and 2010-222879 both filed on Sep. 30, 2010 the entire contents of which are hereby incorporated by reference.

BACKGROUND OF THE INVENTION

1. Field of the Invention

The present invention relates to a battery for an electric vehicle. More particularly, to the structure of the connection including wiring for monitoring voltage connected to the battery when the battery is arranged in the electric vehicle provided with a swing arm. In addition, the present invention relates to a control circuit for an electric vehicle. More particularly, to a structure for radiating heat in the control circuit that controls the energizing of an electric motor that drives the electric vehicle.

2. Description of Background Art

A structure for fixing a battery in an electric vehicle such as an electric motorcycle, a fuel cell motorcycle and a hybrid motorcycle is disclosed, for example, in JP-A No. 2008-221976. The structure includes one end of a swing arm coupled to a swinging shaft with the other end of the swing arm supports a rear wheel. An electric motor for driving the rear wheel is installed on the side of the other end of the swing arm and the battery is arranged in a position in the vicinity of the swinging shaft of the swing arm is disclosed.

In JP-A No. 2006-182315, a configuration wherein a battery is arranged on the front side in a vehicle body is disclosed. A control unit for controlling a motor as a driving source is arranged on the rear side in the vehicle body. Both are connected via a harness.

Further, in JP-A NO. 2005-108693, a battery module is disclosed in which a plurality of battery cells are connected in series. A predetermined voltage is acquired. A method of configuring the battery module by laminating the plurality of battery cells each of which is housed in a predetermined case after each battery cell is wrapped in a soft flexible laminated film and is sealed to be a plate-like laminated cell.

In JP-A No. 2008-221976, though it is described that the battery is arranged in the position in the vicinity of the swinging shaft of the swing arm, the electric connection between the battery and the control unit for controlling the motor is not concretely disclosed. It is possible to improve the electrically connecting structure when the battery is arranged in the swung swing arm.

In the case of the configuration disclosed in JP-A No. 2006-182315, as a location of the battery and a location of the control unit are apart, JP-A No. 2006-182315 has a problem in that the harness that connects both is long with the possibility of an effect on noise.

In the electric vehicle, when motor control is executed, it is an important element to grasp a state of the battery which has a large effect on motor control by the control unit.

However, in the configuration wherein the battery is housed in the swing arm as in the technique described in JP-A No. 2008-221976, a secured housing space is limited. Further, as the space occupied by the case described in JP-A NO. 2005-108693 is also required in the battery cell wrapped in the case and JP-A NO. 2005-108693 has a problem in that it is difficult to increase the capacity of the battery.

As a method for surmounting these problems, it is conceivable that "a potting process" in which a laminated cell is fixed by injecting potting material into a circumference of the laminated cell after a plurality of laminated cells are directly housed in a housing space encircled by external walls of a swing arm and thereafter hardening the potting material. However, it is difficult to inject liquid potting material into only locations required for fixing a battery and when the potting material is also injected into a location not required, the weight of the swing arm is increased and a flow of gas emitted from each laminated cell may be prevented.

A structure for radiating heat generated in an electronic component, a structure for touching a heating element to a lid of a control box via a heat-conduction sheet in the control box in which electronic components are housed and for radiating heat in an electric hybrid bicycle for example is described in JP-A No. 2005-174994.

In JP-A No. 2006-66895, a structure for a power module of an electric cart is configured by a plurality of layers wherein an element is arranged on each layer and the elements are connected via a metallic plate.

In JP-A No. 2005-174994, the configuration wherein the element is touched to the lid that radiates heat via the heat-conduction sheet is described. However, when a plurality of elements are provided, the heat radiation of the whole structure provided with each element is required to be considered.

In JP-A No. 2006-66895, the structure wherein the plural elements are connected to the laminated plate (the metallic plate) is described. However, as the heating element is mounted on every metallic plate and the heating elements are laminated, the whole structure is a large-size. In addition, as the heating elements are connected to the same metallic plate and a phenomenon wherein heat is confined in a package occurs, the JP-A No. 2006-66895 has a problem wherein sufficient heat radiation is not performed when heat radiation is considered in a single package.

SUMMARY AND OBJECTS OF THE INVENTION

The present invention is proposed in view of the above-mentioned situation and its object of an embodiment to provide a battery for an electric vehicle having structure in which the number of parts is reduced and the weight can be reduced, inhibiting noise when a state of a battery is transmitted to a control unit that executes motor control.

To achieve the object, an embodiment of the present invention is based upon a battery for an electric vehicle which supplies electric power to an electric motor (M) that drives a driving wheel (WR) of the electric vehicle, and has a characteristic wherein one board (50c) connected to a battery (56) configured as aggregate of plural battery cells (56a) is provided to the battery (56), the each battery cell (56a) is provided with a positive electrode (56b) and a negative electrode (56c) respectively connected to the side of the board (50c), a plurality of cell connecting parts (603) for collecting each cell information corresponding to the electrodes of each cell are provided to the board (50c) beforehand independent of the number of the battery cells and the board (50c) and each electrode of the each cell are connected via sensor wiring (602) by the cell connecting parts (603) by the number of the each battery cell (56a).

According to an embodiment of the present invention, each output wiring connecting part (600, 601) connected to each output wiring (604) from the positive electrode and the negative electrode respectively to be an end of the aggregate when each battery cell (56a) is connected in series is provided to the board (50c).

According to an embodiment of the present invention, a control unit (50a) in which components of a control circuit that controls the electric motor are arranged and a control unit (50b) in which components of a charging circuit that charges the battery cell (56a) are arranged are provided in the vicinity of the board (50c) and the board (50c) and the control units (50a, 50b) are integrated to be a power module (50).

According to an embodiment of the present invention, the power module (50) is configured by the control board (50a) that mainly controls the electric motor (M), a heating element board (50b) provided with the charging circuit that mainly charges the battery cell (56a) and the board (50c) and that the cell connecting part (603) of the board (50c) is connected to the control board (50a).

According to an embodiment of the present invention, the battery cell (56a) is a laminated type packaged for each cell.

According to an embodiment of the present invention, a foamed body (501) is interposed between the aggregate of the battery cells (56a) and the board (50c), and is housed in a housing space (35) provided to the swing arm (30) that supports the driving wheel (WR), and the battery cell (56a) and the power module including the board (50c) are integrally connected by flowable resin (59) potted into the housing space (35).

According to an embodiment of the present invention, a dedicated board is not required to be provided by the number of battery cells (the capacity of the battery module) by forming the plurality of cell connecting parts (603) beforehand when the sense wiring (602) that outputs the information of the battery cell (56a) is connected to one board (50c), and a general purpose board on which only battery cells of the required number are connected can be used.

According to an embodiment of the present invention, the sensor wiring can be wired in a shortest distance by providing the cell connecting part (603) on the side of the board (50c) for the battery cell (56a). Thus, a cause for noise can be reduced.

According to an embodiment of the present invention, the battery (56) and the control unit can be integrated by closely arranging them. Thus, a power module having high flexibility can be formed. In addition, a dedicated member for fixing the control unit can be reduced by integrating the control unit with the battery (56).

According to an embodiment of the present invention, the effect of a heat load from an element wherein a calorific value of which is large to an element wherein a calorific value is small can be reduced by concentrating elements having the large calorific value and elements having the small calorific value on separate boards.

According to an embodiment of the present invention, the thickness of the cell is reduced, an interval at which the boards are connected can be reduced, and large-sizing for securing the universality of the boards is not required.

According to an embodiment of the present invention, the battery cell (56a) and the board (50c) can be connected with each other that are closely arranged by integrally connecting the battery cell (56a) and the board (50c) via the foamed body (501). Thus, the used quantity of the potting material can be reduced. In addition, the weight can be also reduced without using a dedicated part for fixing. Further, a passage of gas exhausted from the battery 56 can be secured by the foamed body (501).

According to an embodiment of the present invention, a heat radiation structure is provided for effectively radiating the heat of heating elements provided to a control circuit that controls the energizing of an electric motor that drives an electric vehicle.

According to an embodiment of the present invention, a plurality of wiring boards (103a, 103b, 103c) are provided with wiring on each of which wherein the wiring is formed laminated over a board (101) that radiates heat via an insulating adhesive (102). A heating element (105) is mounted on a first heat-conduction member (104) formed on a top face of the uppermost wiring board (103e). A second heat-conduction member (106) is formed on the downside of the lowermost wiring board (103a). The first heat-conduction member (104) and the second heat-conduction member (106) are touched via a third heat-conduction member (108) arranged in a through hole (107) bored through each wiring board (103).

According to an embodiment of the present invention, the second heat-conduction member (106) is formed in the shape of an island including a part corresponding to a position in which the heating element (105) is mounted with a surrounding part (110) that surrounds the island part via a slit (109) is formed and the surrounding part (110) is grounded.

According to an embodiment of the present invention, the wiring board (103) is provided with a power supply line by which power is supplied, one side (X) of the power supply line is formed on the top face of the uppermost wiring board (103c), the other side (Y) of the power supply line is formed at the bottom of the lowermost wiring board (103a) and a signal wire is formed on the intermediate layer.

According to an embodiment of the present invention, the heating element (105) is a semiconductor element, the wiring board (103) is provided with a signal wire (113) for controlling the semiconductor element and the signal wire (113) is arranged in a horizontal direction to the wiring board which makes a right angle with a direction of upper and lower layers of the wiring board that is a direction in which current flows in the power supply line.

According to an embodiment of the present invention, the electric vehicle is an electric vehicle wherein one end of a swing arm (30) is swingably journaled to a vehicle body and a rear wheel is driven by an electric motor (M) provided at the other end, the control circuit is arranged in the swing arm (30) and the control circuit is arranged on the front side of the electric motor in a longitudinal direction of the vehicle.

According to an embodiment of the present invention, the control circuit is a control unit (50) provided with a plurality of boards, the control unit (50) is configured by a control board (50a) on which elements for a control signal are mounted, a heating element board (50b) on which heating elements are mounted and an aluminum board (50c) and the control board (50a) is configured by the plurality of wiring boards.

According to an embodiment of the present invention, the control board (50a) is arranged on the front side of the heating element board (50b) in the longitudinal direction of the vehicle.

According to an embodiment of the present invention, as the heat of the heating element (105) is radiated by the first heat-conduction member (104) formed on the top face of the uppermost wiring board (103c), the heat of the first heat-conduction member (104) is transmitted in the third heat-conduction member (108) arranged in the through hole (107), is led to the second heat-conduction member (106) and is radiated from the board (101) that radiates heat, efficient heat radiation can be performed in multiple places.

According to an embodiment of the present invention, as the surrounding part (110) that surrounds the island part of the second heat-conduction member (106) via the slit (109) exists and is grounded when the first heat-conduction member (104), the second heat-conduction member (106) and the third heat-conduction member (108) also function as wiring and current flows there, creepage distance to insulation material for preventing the short circuit of the side of the first heat-conduction member (104) and the second heat-conduction member (106) can be secured by the slit (109).

In addition, the heat of the heating element (105) is prevented from being transmitted in the horizontal direction of the board and the effect on another component can be inhibited.

According to an embodiment of the present invention, an inductance component by wiring can be reduced by distributing the plus and minus wiring patterns of the power supply line between the uppermost and the lowermost layers and arranging them opposite.

As a result, as the capacity of a smoothing capacitor arranged on the wiring board can be reduced, the area of the board is reduced and the whole control circuit can be compacted.

According to an embodiment of the present invention, the effect of noise on the signal wire (113) on which feeble current flows, compared with current that flows in the power supply line can be reduced by arranging the signal wire (113) at the right angle with the direction in which the current flows.

According to an embodiment of the present invention, heat radiation in the control circuit can be further enhanced by arranging the control circuit in the thermally severe swing arm and arranging the swing arm on the front side of the electric motor, inhibiting the thermal effect of the electric motor.

According to an embodiment of the present invention, the heat radiation of the control board can be enhanced by configuring the control circuit by the plurality of boards and laminating the plurality of wiring boards to be the control board.

According to an embodiment of the present invention, the control board (50a) can be arranged in a location apart from the electric motor (M) and the heating element board (50b) as a result by arranging the control board (50a) on which elements for a control signal are mounted on the front side of the heating element board (50b) on which heating elements are mounted. Thus, an effect from another exothermic member can be inhibited. Further, heat can be radiated by mounting elements the heat radiation of which is satisfactory on the control board (50a) itself.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(a) is a plan view, FIG. 6(b) is a front view, and FIG. 6(c) is a side view;

FIG. 19(a) is a plan view, and FIG. 19(b) is a sectional view taken along a line A-A in FIG. 19(a);

DETAILED DESCRIPTION OF THE PREFERRED EMBODIMENTS

Figure 1:
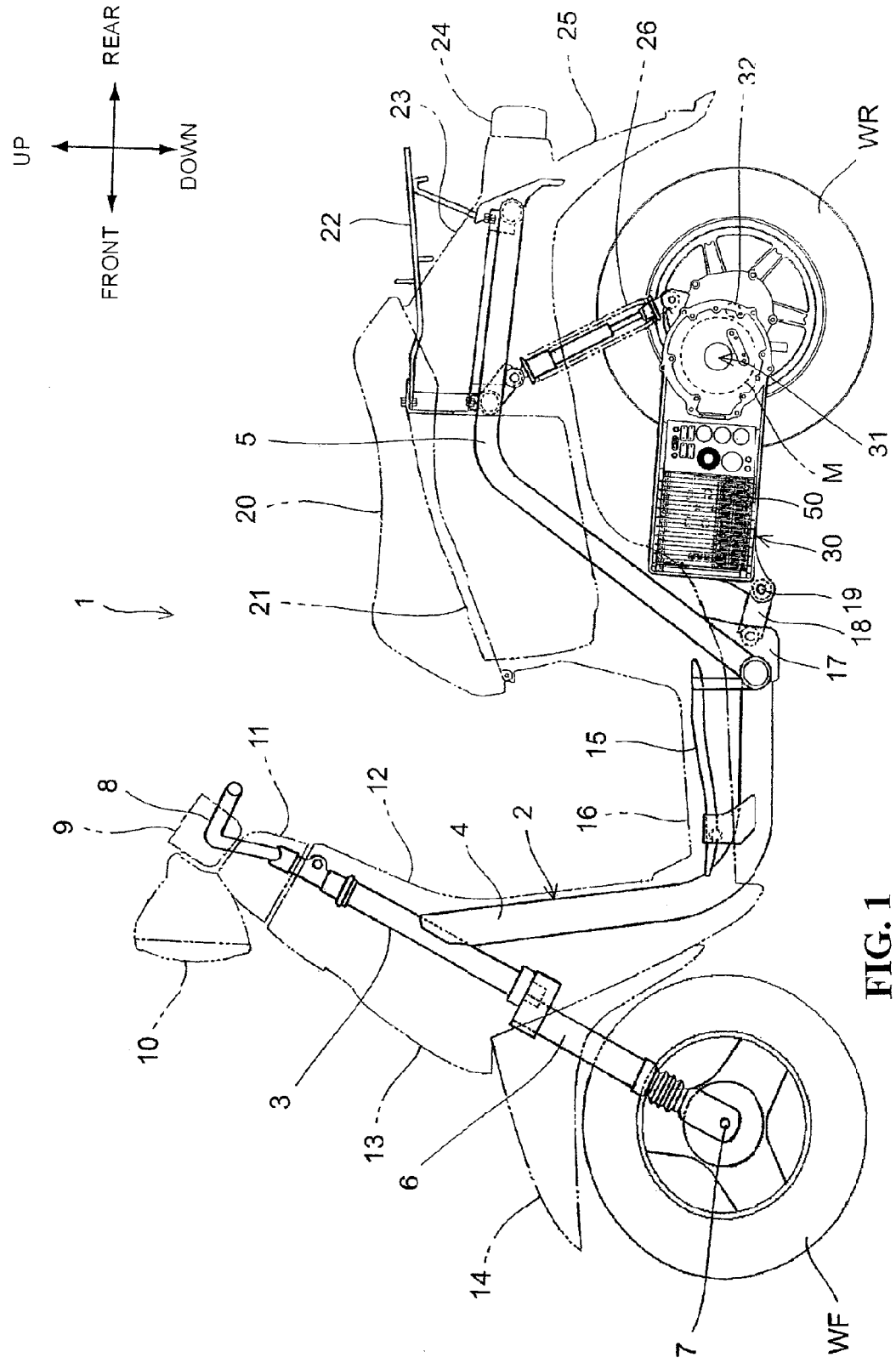
FIG. 1 is a left side view showing an electric motorcycle in which a battery for an electric vehicle according to the present invention is mounted.

Referring to the drawings, a preferred embodiment of the present invention will be described in detail below. FIG. 1 is a side view showing an electric motorcycle 1 in one embodiment of the present invention.

The electric motorcycle 1 is a scooter-type saddle-ride type vehicle provided with a low deck 16 and a rear wheel WR is driven by an electric motor M housed in a swing arm (a unit swing) 30. A head pipe 3 that rotatably journals a stem (not shown) is connected to the front of a body frame 2. A steering handlebar 8 covered with a handlebar cover 11 is connected to an upper part of the stem and a pair of right and left front forks 6 that turnably journals a front wheel WF via an axle 7 are connected to a lower part of the stem.

The body frame 2 is provided with a main pipe 4 extending downwardly from the rear of the head pipe 3 and a rear frame 5 coupled to a rear end of the main pipe 4 and extending upwardly in the rear of a vehicle body. A floor frame 15 that supports the low deck 16 is attached to the main pipe 4 located on the downside of the low deck 16. A pair of right and left pivot plates 17 is attached to a part in which the main pipe 4 and the rear frame 5 are connected.

The swing arm 30 is a cantilever type provided with an arm only on the left side in a vehicle width direction and is swingably journaled to the body frame 2 via a swinging shaft 19 that pierces a link 18 attached to the pivot plate 17. The swing arm 30 is made of metal such as aluminum and has a structure a part of which is hollow, the electric motor M is housed in the vicinity of an axle 32, and a board (control unit) 50 as a control device is arranged in front of the electric motor M in the vehicle body. A battery 56 (see FIG. 3) that supplies electric power to the electric motor M is arranged on the right side in the vehicle width direction of the board (the control unit) 50.

The rear wheel WR is rotatably journaled to the swing arm 30 via the axle 32 and a rear end of the swing arm 30 is suspended from the rear frame 5 via a rear shock absorber 26. A housing box 21 that functions as a space for housing a helmet and belongings is arranged under a seat 20 with the housing box held between the pair of right and left rear frames 5.

The main pipe 4 of the body frame 2 is covered with a front cowl 13 on the front side of the vehicle body and a leg shield 12 on the rear side of the vehicle body. Meters 9 are arranged in an upper part of the handlebar cover 11 and a headlamp 10 is attached on the front side in the vehicle body of the meters 9. A front fender 14 that covers the front wheel WF is fixed to each upper part of the front forks 6.

The outside in the vehicle width direction of the rear frame 5 is covered with a seat cowl 23 and a tail lamp 24 is attached to a rear end of the seat cowl 23. A rear carrier 22 connected to the rear frame 5 protruding on the upside of the tail lamp 24 and a rear fender 25 that covers the upside of the rear of the rear wheel WR is provided on the downside of the tail lamp 24.

Figure 2:
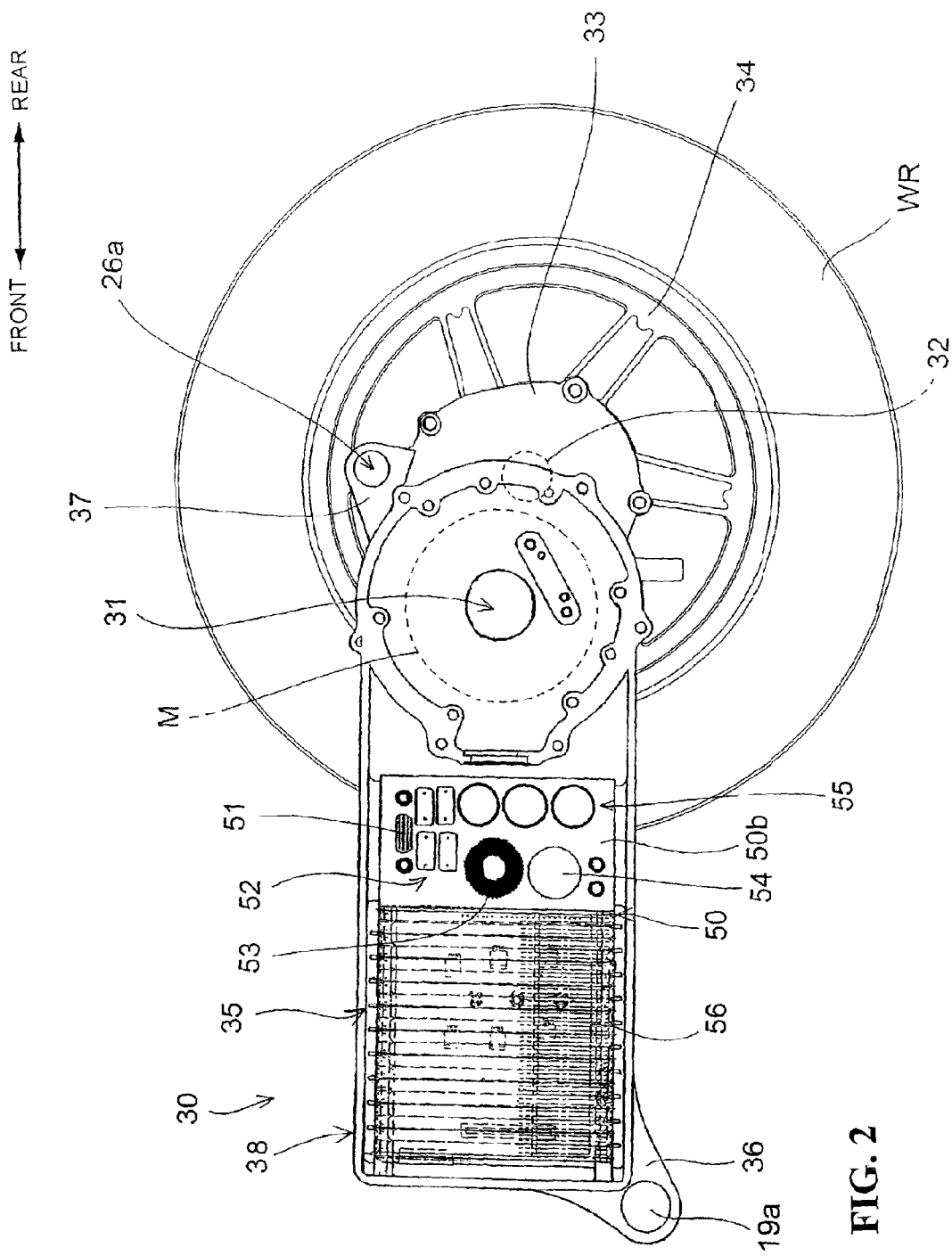
FIG. 2 shows one example of an embodiment of the battery for the electric vehicle according to the present invention and is a left side view showing a swing arm in which the battery for the electric vehicle is arranged.
Figure 3:
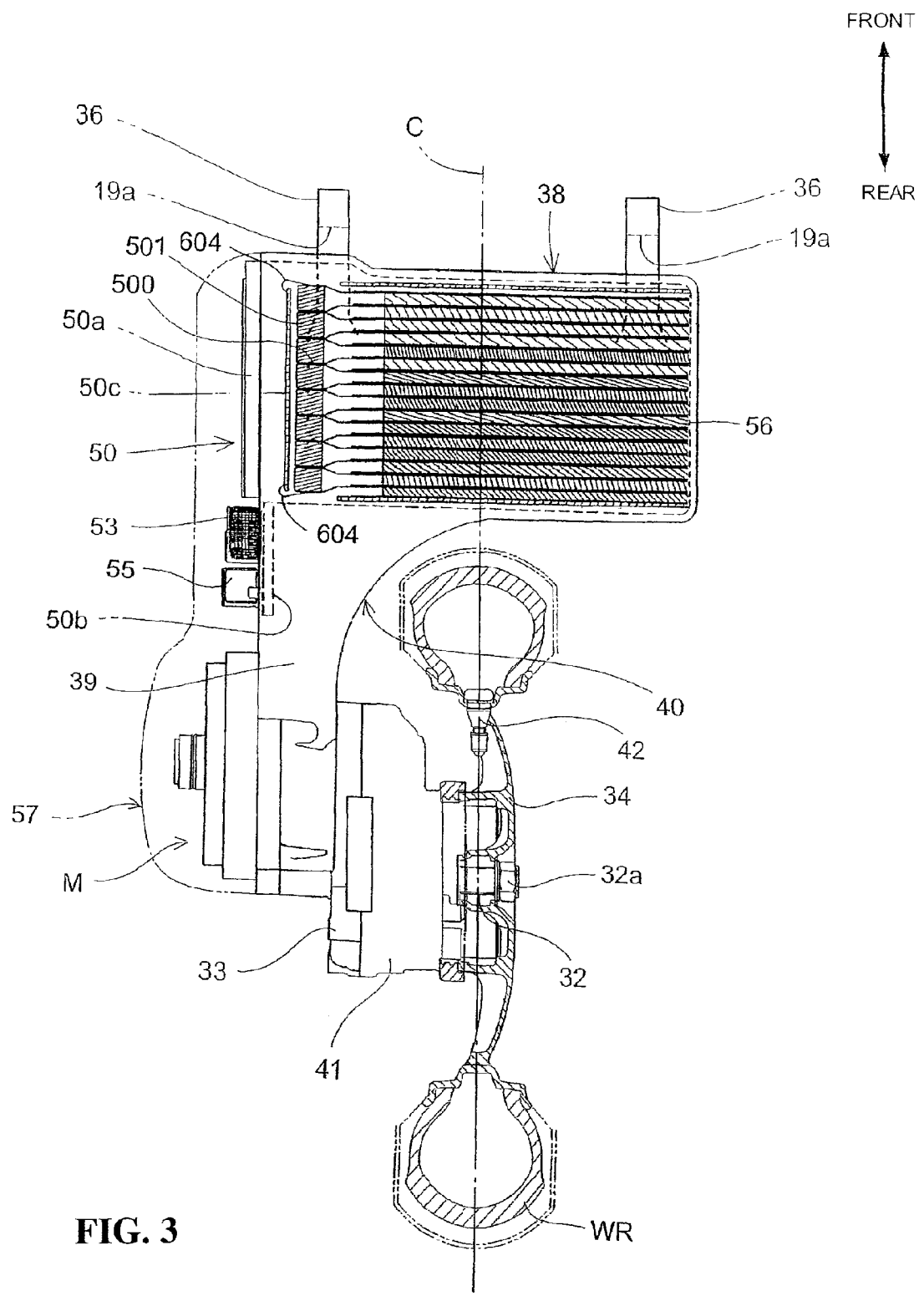
FIG. 3 is a top view showing the swing arm in which the battery for the electric vehicle shown in FIG. 2 is arranged.
Figure 4:
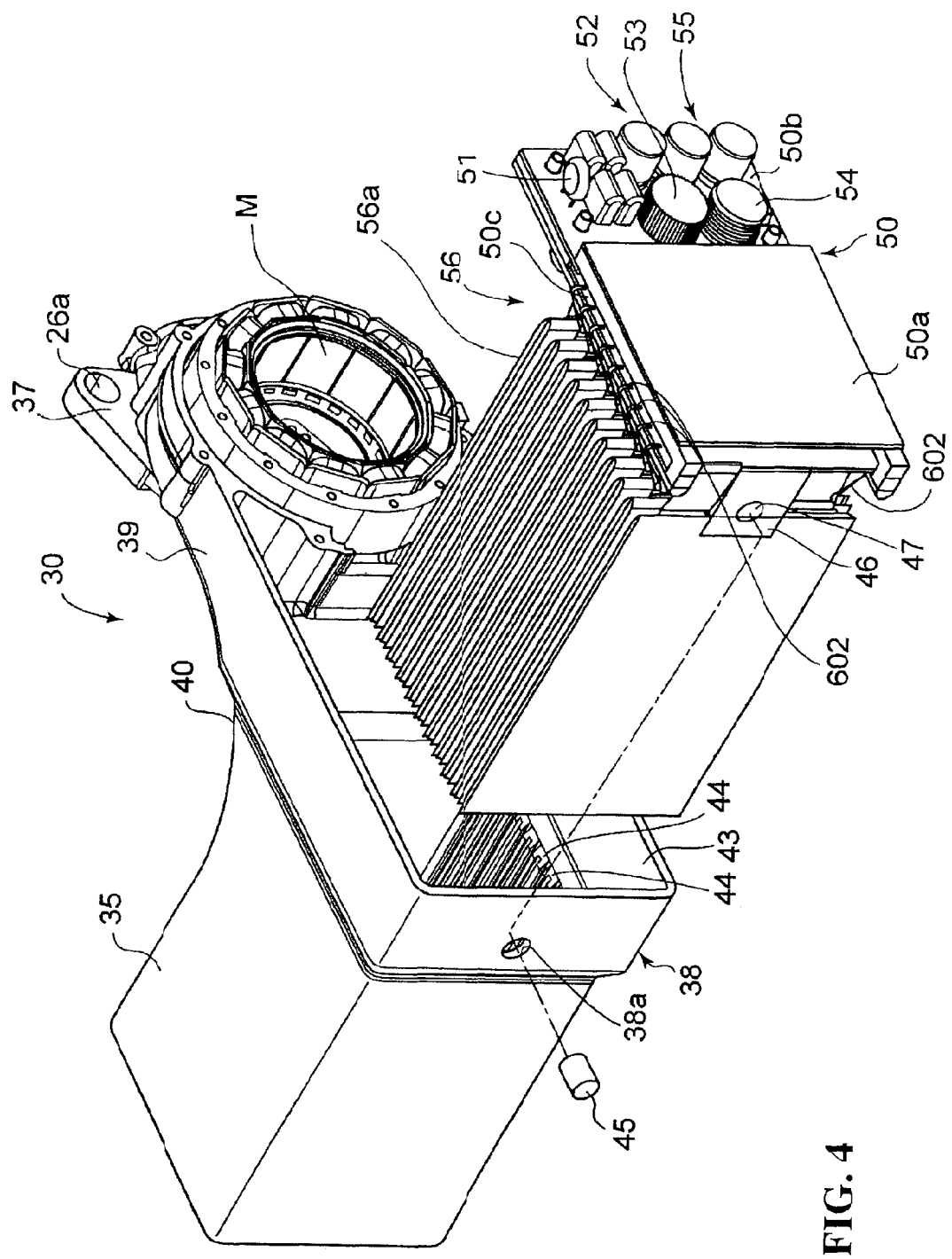
FIG. 4 is an exploded perspective view showing the swing arm.

FIG. 2 is an enlarged side view showing the swing arm 30 that mounts the battery for an electric vehicle. FIG. 3 is a top view showing the swing arm 30 and FIG. 4 is an exploded perspective view showing the swing arm 30. The same reference numeral as in FIG. 1 shows the same or similar parts. As described above, the swing arm 30 has structure which is made of metal such as aluminum and a part of which is hollow and is the cantilever type that supports the rear wheel WR with an arm part 39 on the left side in the vehicle width direction. A pair of right and left pivot flanges 36 in which each through hole 19a for the swinging shaft 19 (see FIG. 1) is formed are provided in a lower part on the front side in the vehicle body of the swing arm 30.

Housing space 35 in which plural battery cells 56 are inserted is formed on the upside in the vehicle body of the pivot flange 36, and a wide case 38 that forms an outer shell of the housing space 35 and the arm part 39 are continuously formed via a curved part 40. A swing arm cover 57 made of a thin plate that integrally covers the board (the control unit) 50 and the electric motor M is attached on the left side in the vehicle width direction of the housing space 35 and the arm part 39.

Reduction gears cases 33, 41 in which reduction gears that reduce the rotation of the electric motor M are housed are attached to a rear end of the arm part 39. The axle 32 projects toward the right side in the vehicle width direction from the reduction gears case 41 and a wheel 34 of the rear wheel WR is fixed to an end of the axle 32 by a nut 32a. A tubeless tire is used for the rear wheel WR and an air bulb 42 is provided to the wheel 34. A mounting flange 37 in which a through hole 26a for attaching the rear shock absorber 26 (see FIG. 1) is formed is provided to the reduction gears case 33.

The rectangular housing space 35 is integrally formed inside in the vicinity of the swinging shaft on the side of one end of the swing arm 30. When the swing arm 30 is insailed on the electric vehicle, the side of an opening (an opening) of the housing space 35 is located on the side of the electric vehicle and the battery 56 can be inserted from the side of the opening.

Next, the structure of the battery 56 of the electric vehicle equivalent to this embodiment will be described in detail, referring to FIGS. 5 to 7.

Figure 5:
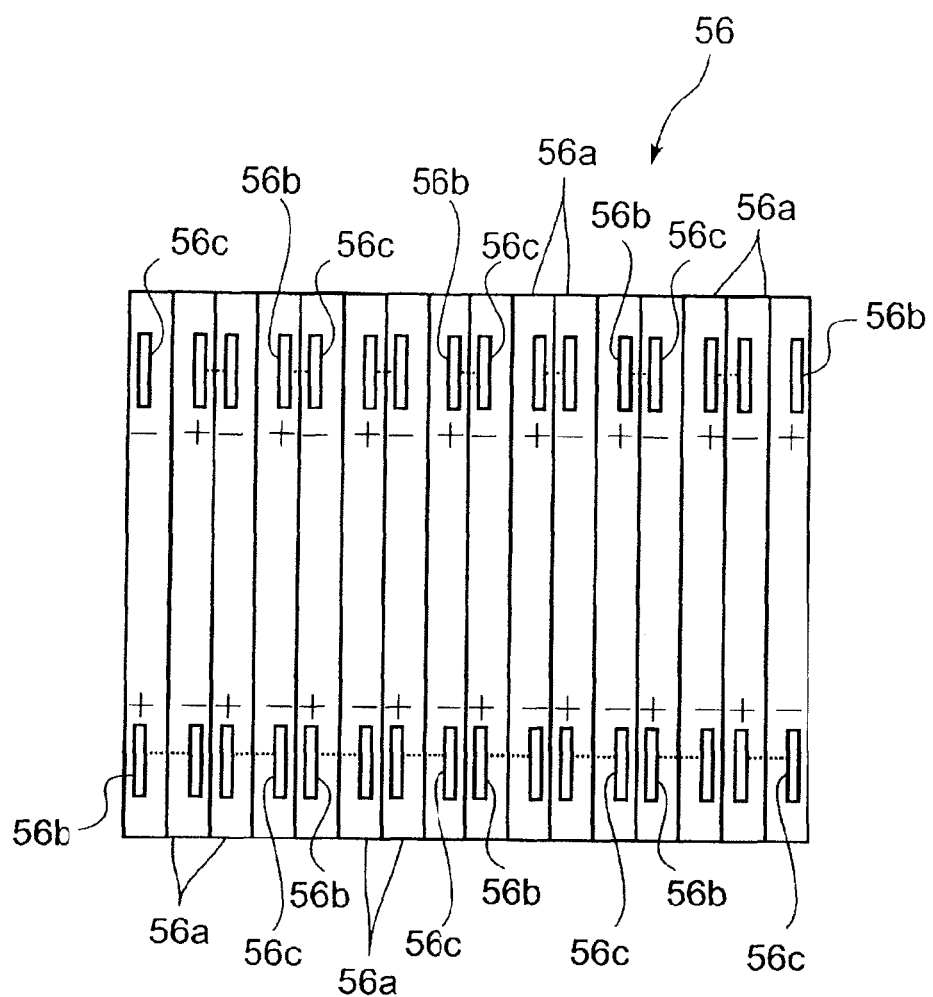
FIG. 5 is a plan view showing an aggregate of plural battery cells.
Figure 6A:
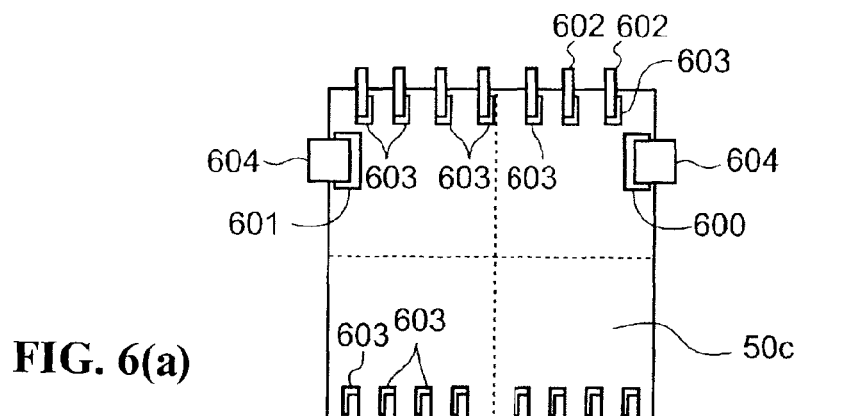
FIGS. 6(a) to 6(c) show positional relation between the aggregate of the plural battery cells and a board.
Figure 6B:
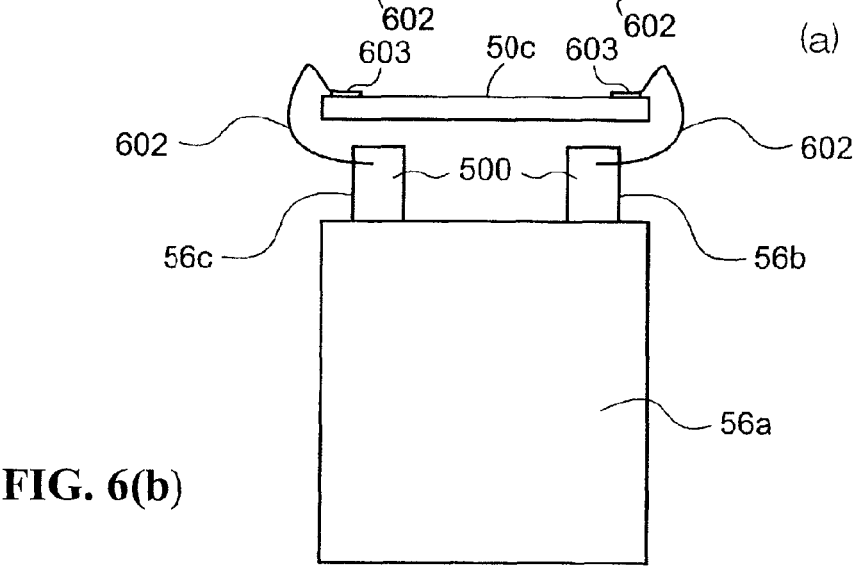
Figure 6C:
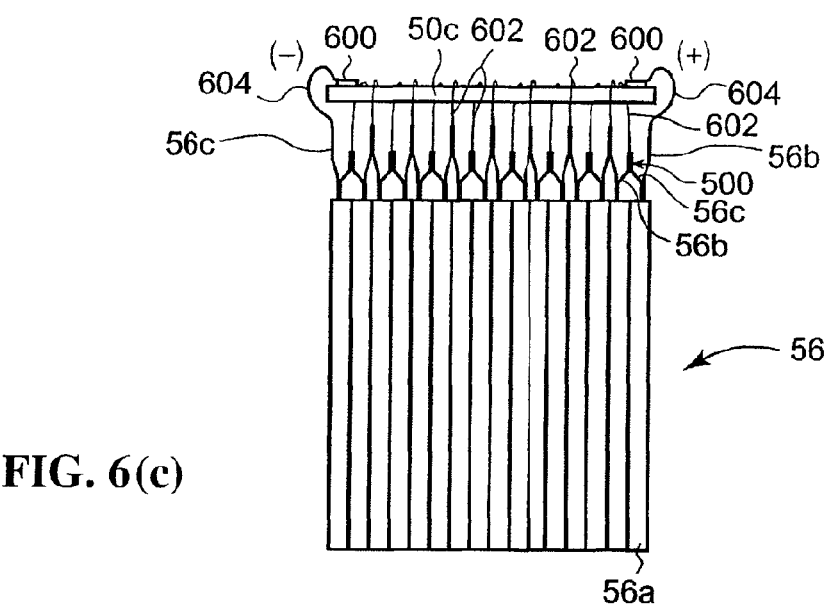

FIG. 5 shows the battery 56 configured by an aggregate of a plurality (sixteen) of battery cells 56a schematically shown. FIGS. 6(a) to 6(c) show the positional relation between the battery 56 and the board to which the battery 56 is connected.

More specifically, the battery 56 is provided with a module structure that enables acquiring predetermined high voltage by configuring the battery as the aggregate in which the plurality of battery cells 56a are connected. Each battery cell 56a has a flat surface, and a positive electrode 56b and a negative electrode 56c are formed by a pair of flexible plates respectively provided on a top face. The positive electrode 56b and the negative electrode 56c are arranged in a position biased on one side of a longer side of the top face. Each battery cell 56a is arranged in a laminated state in which each plane is opposite as shown in FIG. 5. The positive electrode 56b and the negative electrode 56c which are respectively adjacent each other are connected (connected parts are shown by a dotted line). More specifically, each battery cell 56a is arranged with the positive electrode 56b and the negative electrode 56c opposite to each other. A plate-like terminal (a battery terminal) 500 is configured by touching and connecting the plate on the side of the positive electrode and the plate on the side of the negative electrode (see FIG. 6(c)). Each battery cell 56a is connected in series.

A laminated type cell packaged by a soft laminated sheet for each cell is used for each battery cell 56a.

One aluminum board 50c is arranged in the vicinity of an upper part of the battery 56 configured by the aggregate of the plurality of battery cells 56a as shown in FIG. 6(c). On the aluminum board 50c, as shown in FIG. 6(a), plurality of cell connecting parts 603 for transmitting the information of each cell are formed corresponding to the positive electrode 56b and the negative electrode 56c of each battery cell 56a. The plate-like terminal (the battery terminal) 500 in which the adjacent electrodes 56b, 56c are connected and each cell connecting part 603 are connected via sensor wiring 602.

A cell voltage value for example is input to the cell connecting part 603 via the sensor wiring 602 as information of each battery cell 56a and the charged capacity of each battery cell 56a can be detected by processing this value in the control unit.

Figure 7:
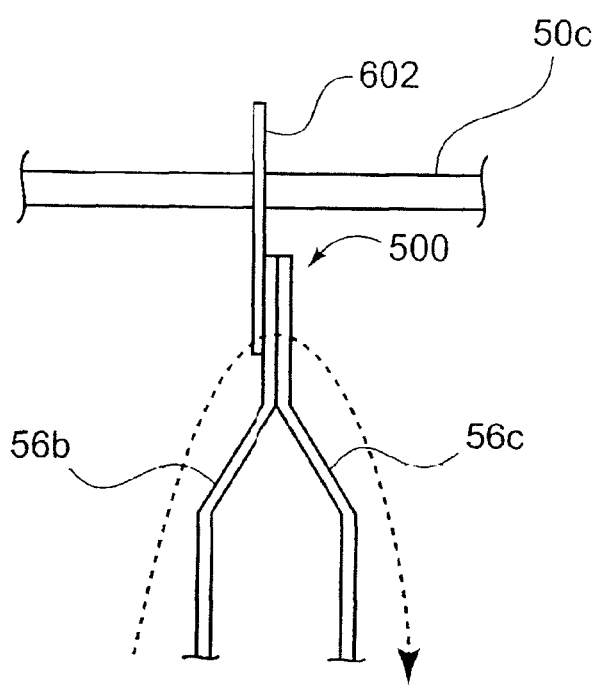
FIG. 7 shows a model of a state in which sensor wiring connects the battery cell and the board.

At this time, as shown in FIG. 7, as the sensor wiring 602 is located in a position in which radiated noise by current (in a direction shown by an arrow) flowing between the battery cells 56a connected in series is counteracted, a filter circuit for removing radiated noise can be simplified. As a result, the accuracy of a voltage monitored value is enhanced. In addition, the accuracy of estimating the residual of the cell can be enhanced.

A dedicated board for connecting the sensor wiring 602 is not required to be provided for each battery cell (the capacity of a battery module) by forming the plurality of cell connecting parts 603 on the aluminum board 50c and a general purpose board can be used.

On the sides of both ends of the aluminum board 50c, the whole terminal on the plus side (an output wiring connecting part) 600 and the whole terminal on the minus side (an output wiring connecting part) 601 are formed, the positive electrode 56b and the negative electrode 56c (see FIG. 6(c)) which are located at ends of the aggregate when each battery cell 56a is connected in series are connected via each output wiring 604, and power is supplied outside from the battery 56.

The output wiring 604 is reduced the most by arranging the battery 56 in the vicinity of the aluminum board 50c and a loop of the output wiring 604 can be minimized. As a result, caused inductance can be also reduced.

The above-mentioned battery for the electric vehicle is mounted in the electric motorcycle with the battery directly installed in the swing arm 30 without using a dedicated case by integrating the battery 56 with the board (the control unit) 50, inserting and fixing the battery into/to the housing space 35 of the swing arm 30 with the battery integrated with the board.

The battery 56 has module structure for acquiring the predetermined high voltage by connecting the plurality of battery cells as described above. The plate-like battery cell 56a is housed in the substantially rectangular parallelepipedic housing space 35 formed in the wide case 38 with its flat surface directed in a longitudinal direction of the vehicle body and laminated. Hereby, the battery 56 as heavy equipment is arranged in the swing arm 30 close to the swinging shaft 19, the moment of inertia when the swing arm 30 is swung is reduced. Thus, a smooth swinging operation is enabled. In addition, high energy density and the enhancement of heat radiation performance can be expected by adopting the laminated type battery to the battery cell 56a. Further, work for attaching the battery cell to the swing arm 30 and work for replacing batteries are facilitated.

The board (the control unit) 50 is closely arranged on the left side in the vehicle width direction of the battery 56 as shown in FIGS. 3 and 4. The board (the control unit) 50 is configured by a control board 50a, a heating element board 50b and the aluminum board 50c, and the boards are arranged with respective flat surfaces directed in the vehicle width direction. The control board 50a is closely arranged on the left side in the vehicle width direction of the battery 56 and the heating element board 50b is coupled to the rear side in the vehicle body of the control board 50a. The aluminum board 50c is closely arranged on the left side in the vehicle width direction of the battery 56. A battery charger is configured by circuits, elements and others dispersed on each board (a thermistor 51, a group of input-output filters 52 for the battery charger, a capacitor 53 for improving a battery charger power factor, a capacitor 54 for converting DC of the battery charger and a group of various transformers 55). An electric system can be directly connected by configuring the battery charger 200 with the components dispersed on each board and building the boards in the swing arm 30 and the number of parts can be reduced by simplifying flexible wiring (a harness).

Figure 8:
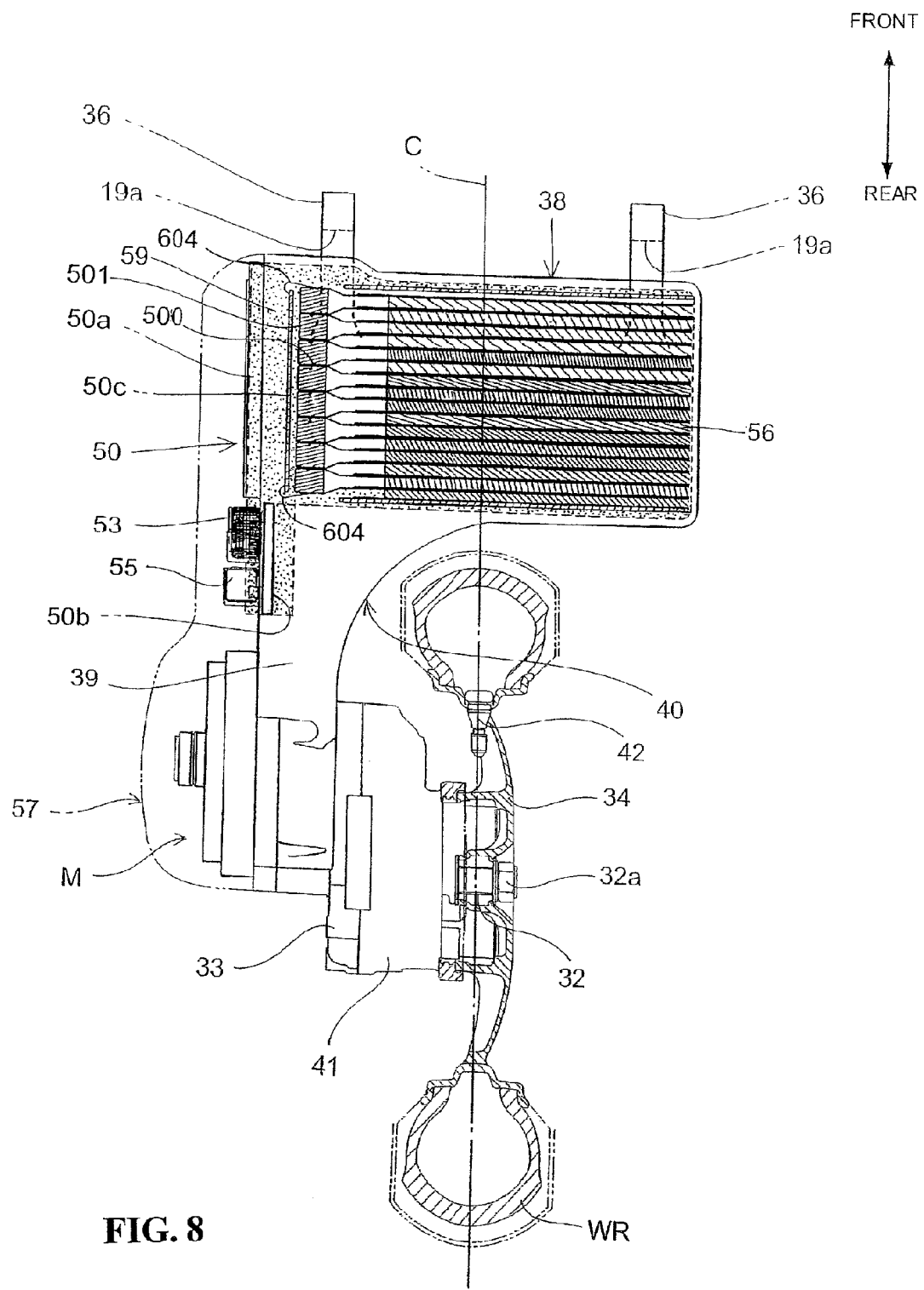
FIG. 8 is a top view showing the swing arm in a state after a potting process.

A sponge rubber 501 having a predetermined thickness is arranged between the battery 56 and the aluminum board 50c as shown in FIGS. 3 and 8. A plurality of slits for inserting the plate-like terminal (the battery terminal) 500 provided at a left end of each battery cell are formed in the sponge rubber 501. A position of the plate-like terminal is specified by inserting the plate-like terminal (the battery terminal) 500 into each slit. According to the sponge rubber 501, the quantity of potting material 59 used in a potting process described later is reduced and the weight of the swing arm 30 can be reduced. The aluminum board 50c is arranged close to the sponge rubber 501.

Elements for a control signal that hardly heat are mounted on the control board 50a. In the meantime, elements in which large current flows and which heat are mounted on the heating element board 50b and the aluminum board 50c. Out of heating elements, the thermistor 51, the group of input-output filters 52 for the battery charger, the capacitor 53 for improving the battery charger power factor, the capacitor 54 for converting DC of the battery charger, the group of various transformers 55 which respectively require large heat capacity are mounted on the heating element board 50b and out of the heating elements, electronic components which do not respectively require large heat capacity are mounted on the aluminum board 50e.

In this way, a heat load applied to other elements by the heat of the heating elements mounted on the heating element board 50b can be reduced by providing the heating element board 50b on which only elements a calorific value of which is large are collectedly arranged. Further, the degree of freedom in the layout of the pivot flange 39, the through hole 19a and others can be enhanced by separating the position of the heating elements and the position of other control elements.

More specifically, as for the board (the control unit) 50, functional optimum arrangement is enabled by concentrating the components that hardly heat on the control board 50a and arranging modules of the components which respectively require large heat capacity on the heating element board 50b on the side at a front end of the swing arm 30 of the control board 50a and space can be saved.

Each battery cell configuring the battery 56 is fixed to the aluminum board 50c and the control unit 50 is arranged on the side of the front end of the swing arm.

The charge of the battery 56 and the supply of voltage from the battery 56 to the control board 50a for driving the electric motor M are controlled by electrically connecting circuits of the control unit 50 and each battery cell.

In addition, the thermal effect of the heating elements can be prevented from having on the control hoard 50a located on the upstream side in a traveling direction of the vehicle body by arranging the heating element board 50b on the rear side in the vehicle body of the control board 50a. Further, the thickness in the vehicle width direction can be reduced by arranging the control board 50a outside the battery 56 in the vehicle width direction. As the heating element board 50b is arranged in a position overlapped with the rear wheel WR in a side view of the vehicle body, space formed between the battery 56 and the electric motor M is effectively utilized, the heating elements can be arranged there. Thus, the length of the swing arm can be prevented from being too long.

As shown in FIG. 4, the battery 56 is in the shape of a substantially rectangular parallelepiped its longitudinal side of which is directed in the vehicle width direction by laminating battery cells by a predetermined number in the longitudinal direction of the vehicle body and is housed in the housing space 35 of the wide case 38. A guide groove 44 for housing each plate-like battery cell in a predetermined position is formed on an inside face 43 of the housing space 35.

The guide groove 44 can position each cell with the side of each cell engaged with the guide groove 44 when each battery cell 56a configuring the battery 56 is housed by forming a plurality of grooves corresponding to each battery cell 56a on a top face and a bottom in the housing space in a direction in which the battery 56 is inserted. A dedicated part for holding the cell can be reduced by providing the guide groove 44 and the whole can be compacted.

A through hole 38a for fitting a sealing plug 45 is formed in the wide case 38. In the meantime, a through hole 47 engaging with the sealing plug 45 is formed in a coupling plate 46 that couples the battery 56 and the board (the control unit) 50 in the front of the vehicle body. The sealing plug 45 and the through holes 38a, 47 are used in "the resin potting process" executed in the assembly of the swing arm 30. The potting process physically fixes the battery 56 and the board (the control unit) 50 to the swing arm 30, insulates the board (the control unit) 50 and isolates the vibration of the board. Thus, the heat radiation of each element is enhanced.

The potting process is executed by directing the opening of the wide case 38 upward and injecting the potting material 59 made of liquid resin hardened over time into a circumference of the battery 56 after positioning is performed by inserting the battery 56 and the board (the control unit) 50 into the wide case 38 and fitting the sealing plug 47 into the through holes 38a, 47. The potting material 59 is injected so that it covers the control board 50a and the aluminum board 50c as shown in FIG. 8 and covers a part of the side on which the capacitor 53. The group of various transformers 55 and others are mounted on the heating element board 50b. The potting material 59 is also provided with a function for enhancing the heat radiation of the battery 56 and others.

When the sealing plug 45 is removed after the potting material 59 is hardened, a communicating hole that communicates with the inside and the outside of the wide case 38 is formed in a position in which the sealing plug 45 is located. According to the communicating hole, gas is smoothly exhausted outside even if the gas is exhausted from the battery 56 and pressure in the swing arm 30 can be prevented from rising.

More specifically, a relief passage for removing high pressure that leads air pressure when the temperature of ambient atmosphere of the battery turned high temperature rises outside can be formed by the potting material and a dedicated member for forming the relief passage can be reduced.

The potting material injected into the housing space 35 from its circumference fills the space around the battery 56 housed in the housing space 35, is hardened in a state in which the potting material exists in the space at least including a part in which an upper part of the cell and the control board 50a are coupled in the housing space 35, and a position of the battery 56 is fixed in the housing space 35 via the potting material. In this state, the side of the opening of the housing space 35 is covered with the swing arm cover 57.

According to this structure, the battery 56 can be integrated with the swing arm 30 by fixing the battery 56 positioned in the housing space 35 via the potting material. In addition, a dedicated fixing part can be reduced by fixing the control board 50a together with the battery (each battery cell) 56 via the potting material.

According to the above-mentioned configuration, a dedicated case for holding the battery 56 is not required, and the number of parts and the weight can be reduced by utilizing the swing arm 30 itself for a case for holding the battery 56, securely fixing the battery 56 to the swing arm 30.

As the battery 56 is a piece of heavy equipment that can be built in from the rear side, the swing arm 30 is not required to be partially overhanged in accordance with the shape of the battery 56, enhancing the ease of assembling the vehicle and the battery can be securely fixed to the swing arm 30, contributing to reducing the number of parts and the weight.

As the swing arm 30 can be used as a radiator by directly fixing the battery 56 to the swing arm 30, the cooling effect of the battery 56 can be enhanced.

In addition, the whole battery unit can be compacted by simplifying the structure in which the battery 56 is mounted and a degree of freedom in the design of another configuration such as the arrangement of electric equipment can be enhanced.

Figure 9:
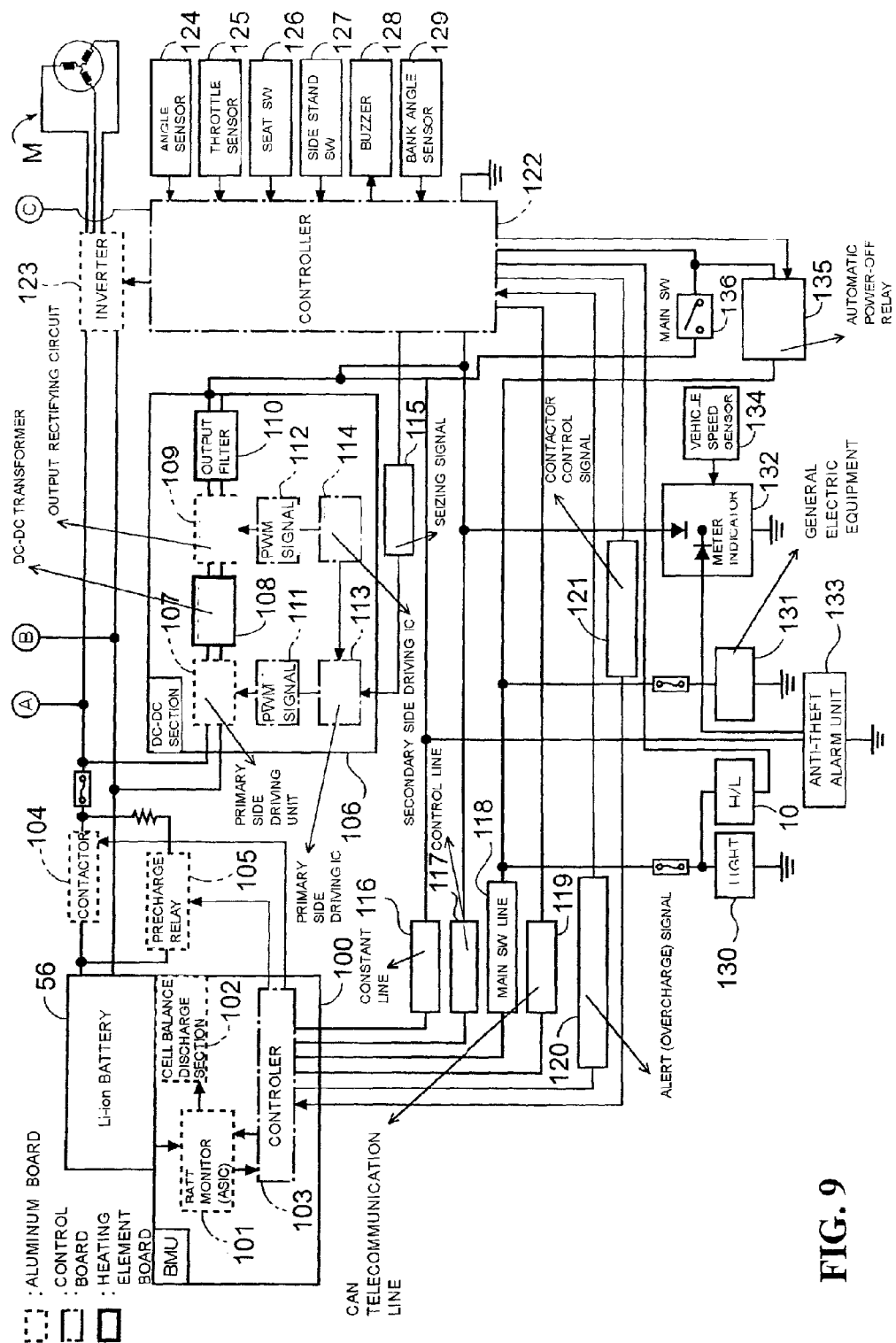
FIG. 9 is a block diagram showing the whole configuration of an electric system applied to the electric motorcycle.
Figure 10:
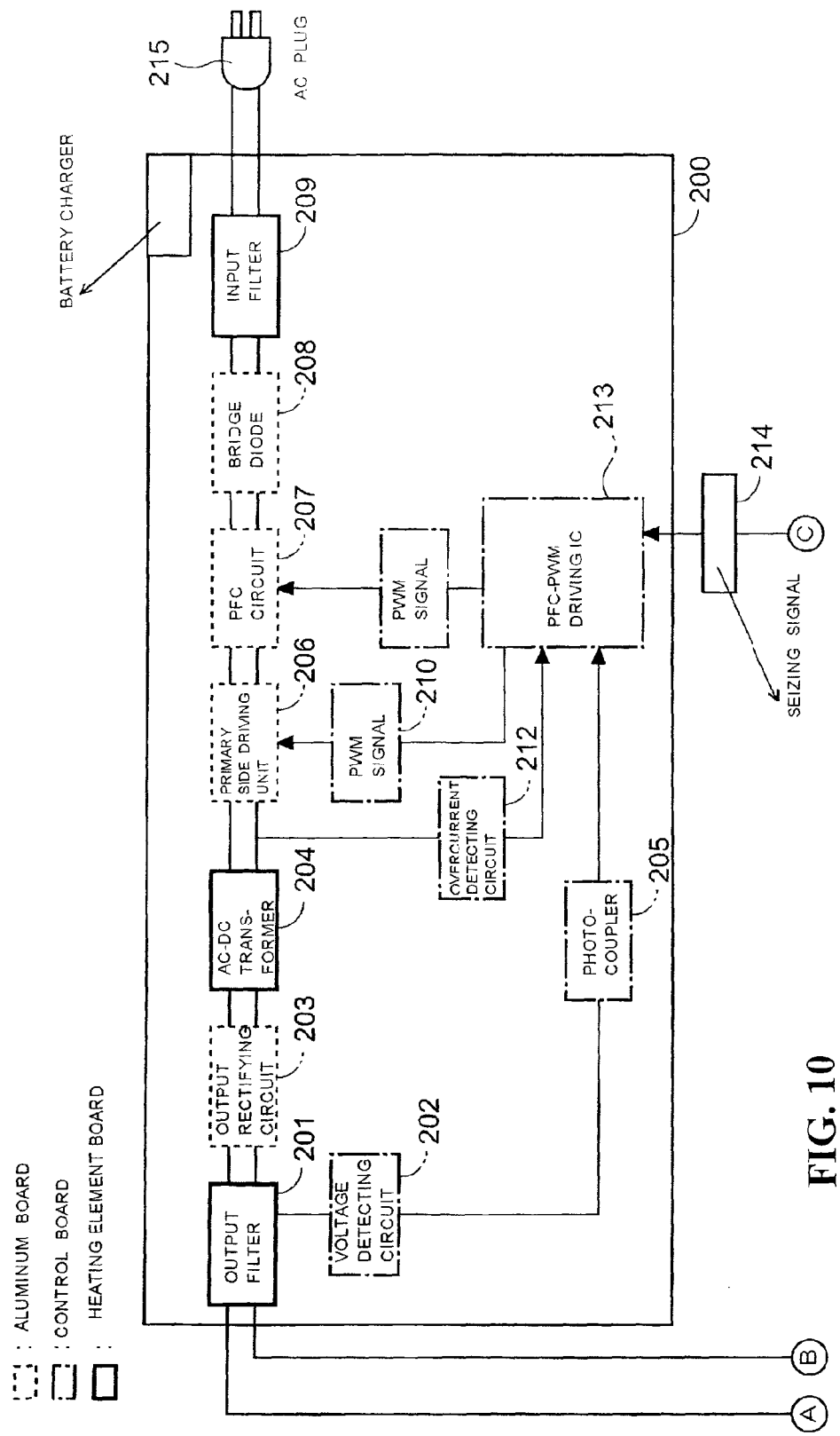
FIG. 10 is a block diagram showing the configuration of a battery charger in the electric system applied to the electric motorcycle.

FIGS. 9 and 10 are block diagrams showing the configuration of an electric system applied to the electric motorcycle 1. The same reference numeral used above denote the same or the similar parts. FIG. 10 shows component circuits of only the battery charger and FIG. 9 shows the whole configuration except the battery charger. In FIGS. 9 and 10, the elements mounted on the control board 50a are shown by "an alternate long and short dash line," elements mounted on the aluminum board 50c are shown by "a broken line," and the elements mounted on the heating element board 50b are shown by "a full line."

On the control board 50a, the elements in which small current for a control signal flows are mounted. These elements hardly heat and the control board 50a is formed by a glass epoxy board. In addition, on the aluminum board 50c, the elements in which large current flows and which cannot radiate heat by themselves are mainly mounted. These electronic components are, for example, a semiconductor element such as FET and a diode, a resistor and a film capacitor and the heat radiation is enhanced by being mounted on the aluminum board 50c having high thermal conductivity. Further, on the heating element board 50b, large-sized electronic components in which large current flows and which can radiate heat by themselves are mainly mounted. These electronic components are, for example, an inductor, a transformer and an electrolytic capacitor and the heat build-up is enhanced by arranging the heating element hoard 50b in a position on which the heat of the battery hardly has an effect.

In the block diagrams shown in FIGS. 9 and 10, it is an input filter 209 and an output filter 201 (respectively equivalent to the group of input-output filters 52) of the battery charge 200, a PFC circuit 207 (equivalent to the capacitor 53 for improving the battery charger power factor), an AC-DC transformer 204 (equivalent to the capacitor 54 for converting DC of the battery charger), a DC-DC transformer 108 (equivalent to the group of various transformers 55) of a DC-DC converter 106 and an output filter 110 that are mounted on the heating element board 50b.

As shown in FIG. 9, the lithium ion battery 56 is electrically connected to the input side of an inverter 123 via a contactor 104 and the output side of the inverter 123 is connected to the electric motor M via a three phase alternating line. A precharge relay 105 that prevents the rapid rise of supply current is connected in parallel to the contactor 104 to which on-off control is applied by a mechanical contact operated by electromagnetic force.

A battery management unit (BMU) 100 includes a circuit (ASIC) 101 for monitoring the voltage, the temperature and others of the battery 56, a cell balance discharge device 102 for correcting the dispersion in capacity of the battery cell and a controller 103 for controlling these.

A constant line 116, a control line 117, a main switch line 118 and a CAN telecommunication line 119 are arranged between the controller 103 in the BMU 100 and a controller 122 for controlling the inverter 123. In addition, an alert signal 120 for alerting overcharge is transmitted from the controller 103 in the BMU 100 and a contactor control signal 121 is transmitted from the controller 122 for controlling the inverter 123.

Signals from an angle sensor 124 that detects the rotation angle of the electric motor M, a throttle sensor 125 that detects quantity in which a throttle lever is operated by a rider, a seat switch (SW) 126 that detects whether the rider is seated on the seat 20 or not, side stand SW 127 that detects whether a side stand (not shown) of the electric vehicle 1 is stored or not and a bank angle sensor 129 that detects the inclination (an angle of bank) of the electric vehicle are input to the controller 122 for controlling the inverter 123. A buzzer 128 as an alarm unit is operated according to an operating signal from the controller 122 when the overdischarge and others of the battery 56 are detected.

The constant line 116 is connected to the DC-DC converter 106 that converts large current supplied from the battery 56 to current for control. The DC-DC converter 106 includes a primary side driving unit 107, a DC-DC transformer 108, an output rectifying circuit 109, an output filter 110, primary side driving IC 113 that supplies a PWM signal to the primary side driving unit 107 and secondary side driving IC 114 that supplies a PWM signal to the output rectifying circuit 109. A seizing signal 115 is supplied to the primary side driving IC 113 from the controller 122. In addition, the side of each one end of an anti-theft alarm unit 133 and main SW 136 is connected to the constant line 116.

The control line 117 is connected to the controller 122 for controlling the inverter 123. One end of a meter indicator 132 as an operation indicator lamp of the anti-theft alarm unit 133 is connected to the control line 117. In addition, a vehicle speed sensor that detects vehicle speed is connected to the meter indicator 133 and the meter indicator 133 functions as a speed alarm lamp when vehicle speed exceeds a predetermined value.

A light 130 such as a turn signal lamp, a headlight (H/L) 10 and general electric equipment 131 such as a fan for cooling the battery are connected to the main SW line 118. An end of the main SW line 118 is connected to an automatic power-off relay 135 that enables operating the headlight 10 and others under a predetermined condition even if the main SW 136 is turned off.

As shown in FIG. 10, input and output lines (A, B) in which direct current flows and which are connected to the battery 56 and an AC plug 215 connected to a commercial AC power supply and others are connected to the battery charger 200. The battery charger 200 includes an input filter 209, a bridge diode 208, a PFC circuit 207 as a circuit for improving a power factor, a primary side driving unit 206, an AC-DC transformer 204, an output rectifying circuit 203 and an output filter 201. A signal from an overcurrent detecting circuit 212 arranged between the primary side driving unit 206 and the AC-DC transformer 204 is input to PFC-PWM driving IC 213 and in the meantime, a signal from a voltage detecting circuit 202 connected to the output filter 201 is input to the PFC-PWM driving IC 213 via a photocoupler 205. The PFC circuit 207 and the primary side driving unit 206 are driven by each PWM signal 210, 214 output from the PFC-PWM driving IC 213. A seizing signal 214 (C) from the controller 122 for controlling the inverter 123 is input to the PFC-PWM driving IC 213.

Figure 11:
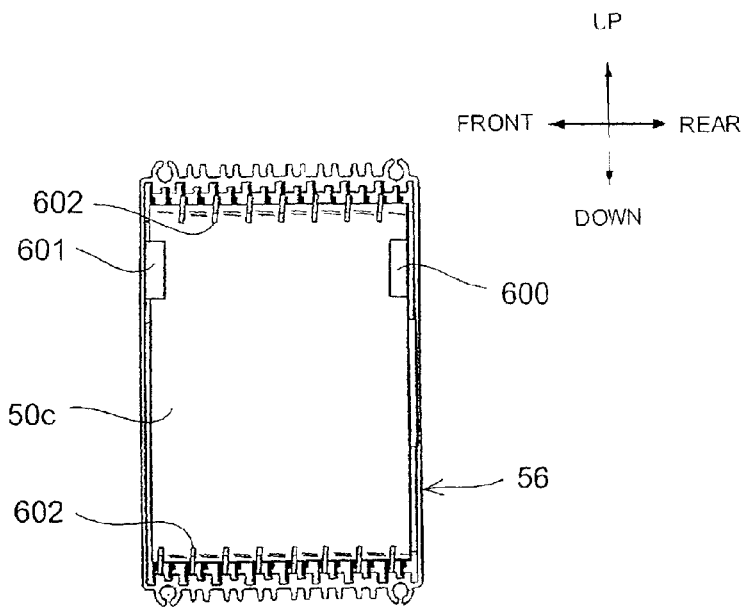
FIG. 11 is a front view showing the battery viewed from the left side of a vehicle body.
Figure 12:
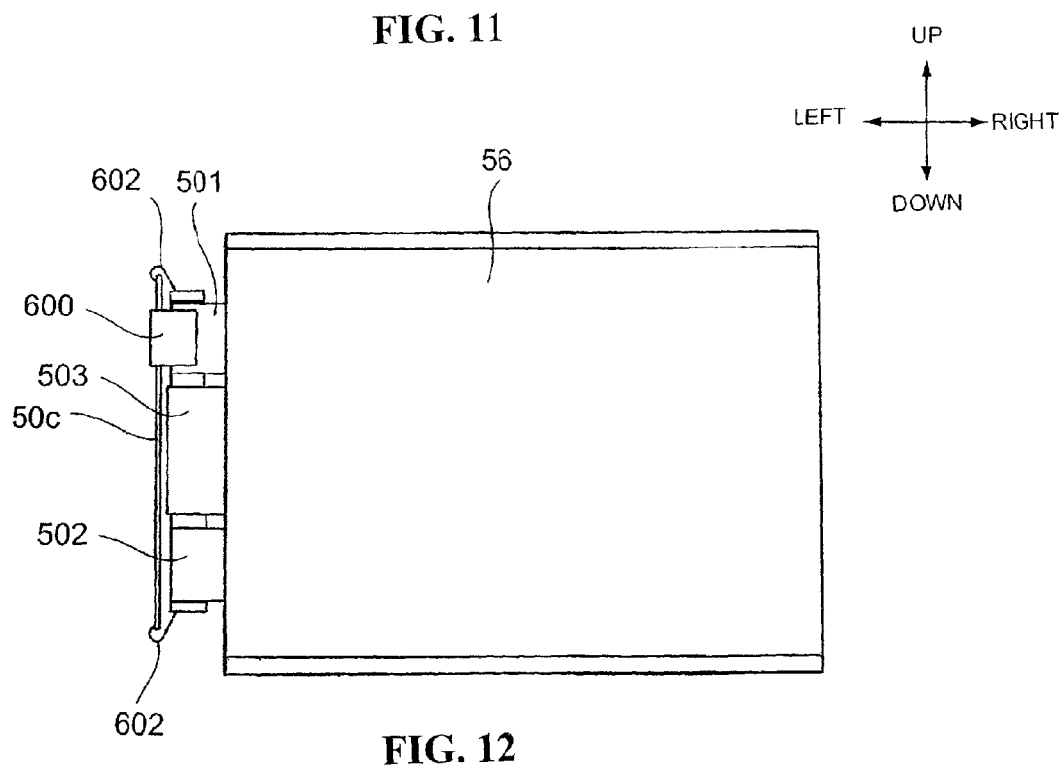
FIG. 12 is a side view showing the battery viewed from the rear side of the vehicle body.

FIG. 11 is a front view showing the battery 56 when it is viewed from the left side of the vehicle body. FIG. 12 is a side view showing the battery when it is viewed from the rear side of the vehicle body. The battery cells laminated in the longitudinal direction of the vehicle body are mutually connected in series by connecting the electrode projecting on the left side in the vehicle width direction from each battery cell. The whole terminal on the minus side 601 of the whole battery 56 extends from the battery cell 56*a* on the front side (on the left side in the drawing) of the vehicle body and is connected to the aluminum board 50*c*, the whole terminal on the plus side 600 of the whole battery 56 extends from the battery cell 56*a* on the rear side (on the right side in the drawing) of the vehicle body and is extended and is connected to the aluminum board 50*c*.

The sensor wiring 602 for detecting the charged capacity of each battery cell 56*a* is wired between each battery cell and the aluminum board 50*c*. In this embodiment, sponge rubbers 501, 502, 503 are provided between an end on the left side of the vehicle body of the battery 56 and the aluminum board 50*c*. In FIGS. 11 and 12, for the sake of the convenience of explanation, an internal wall of the housing space 35 formed in the swing arm 30 is shown as if the internal wall were the case that covered a circumference of the battery 56 and were a single part.

The sponge rubbers 501, 502, 503 in this embodiment are made of elastomer as expanded rubber. The elastomer is not infiltrated by the potting material, is excellent in heat resistance and the absorptivity of vibration energy, and further, is a light material that penetrates gas. In the battery structure in this embodiment, each battery cell (each laminated cell) 56*a* and the aluminum board 50*c* are required to be coupled via the sensor wiring 602 and it is desired that the whole aluminum board 50*c* is sealed by the potting material 59. However, even if space between each battery cell (each laminated cell) 56*a* and the aluminum board 50*c* is all filled with the potting material 59, not only the potting material 59 in this space does not fulfill its function for fixing the battery 56 to the housing space 35 but the weight of the swing arm 30 is increased. Further, a passage for gas, described later, that is exhausted from the battery 56 is lost. Therefore, in this embodiment, a state in which the space is filled with the potting material is optimized by arranging the sponge rubbers 501, 502, 503 in the space between each battery cell (each laminated cell) 56*a* and the aluminum board 50*c*.

The potting material 59 the viscosity in injection of which is relatively high has only to be injected by quantity in which at least the whole aluminum board 50*c* is covered with the potting material and the battery 56 can be fixed in a circumference of the opening of the housing space 35 formed in the wide case 38, and the side and a bottom of the housing space 35 are not necessarily required to be filled with the potting material.

Figure 13:
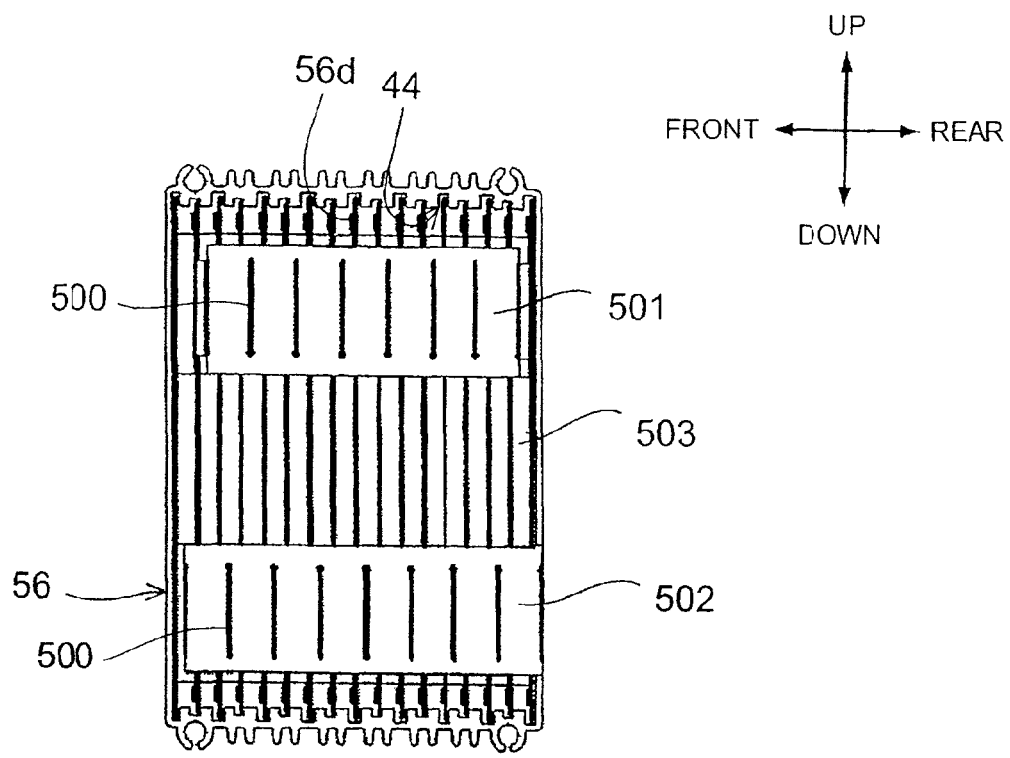
FIG. 13 is a front view showing the battery in a state in which an aluminum board is detached.

FIG. 13 is a front view showing the battery 56 in a state in which the aluminum board 50*c* is detached. The sponge rubbers 501, 502, 503 are respectively in the shape of a substantially rectangular parallelepiped a longer side of which is directed in the longitudinal direction of the vehicle body. As described above, the battery 56 in this embodiment has a configuration wherein the terminal on the minus side and the terminal on the plus side as the plate-like terminal (the battery terminal) 500 (see FIG. 8) project from predetermined positions vertically apart in the vehicle body on an end face on the left side in the vehicle width direction of the plate-like battery cell (the laminated cell) 56*a*. Each battery cell (each laminated cell) 56*a* can be easily connected in series by laminating the adjacent battery cells (the adjacent laminated cells) 56a in a state in which both surfaces and both backs are alternated.

Figure 14:
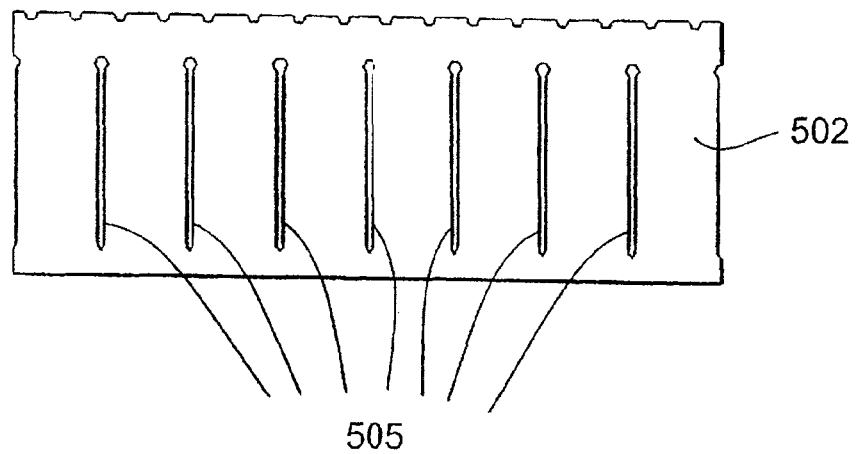
FIG. 14 is an enlarged view showing a sponge rubber.

As shown in FIG. 14, each slit 505 for inserting the plate-like terminal (the battery terminal) 500 as a junction of the terminal on the minus side (or the terminal on the plus side) of the certain battery cell and the terminal on the plus side (or the terminal on the minus side) of the battery cell adjacent to this is formed in the upper sponge rubber 501 and the lower sponge rubber 502.

According to the upper sponge rubber 501 and the lower sponge rubber 502, the battery terminal of each laminated cell 56a can be stably fixed. The central sponge rubber (the second sponge rubber) 503 arranged between the upper sponge rubber 501 and the lower sponge rubber 502 not only contributes to the reduction of the potting material and others but functions as a passage of gas exhausted from an explosion proof valve provided to each battery cell (each laminated cell). The details will be described later.

Material excellent in heat insulation is used for the sponge rubbers 501, 502, 503. Thus, an interval between the aluminum board 50c and the battery 56 is narrowed, preventing the aluminum board 50c from being influenced by the heat of the battery 56, and the sensor wiring and installed space can be reduced.

A fin 56d fitted into the guide groove 44 formed on the internal wall of the housing space 35 is formed on an end face in a vertical direction of the vehicle body of each battery cell (each laminated cell) 56a. When the battery cells (the laminated cells) 56a are inserted into the housing space 35, an interval in a direction in which the battery cells (the laminated cells) 56a are laminated is specified by fitting the fin 56d into the guide groove 44.

Figure 15:
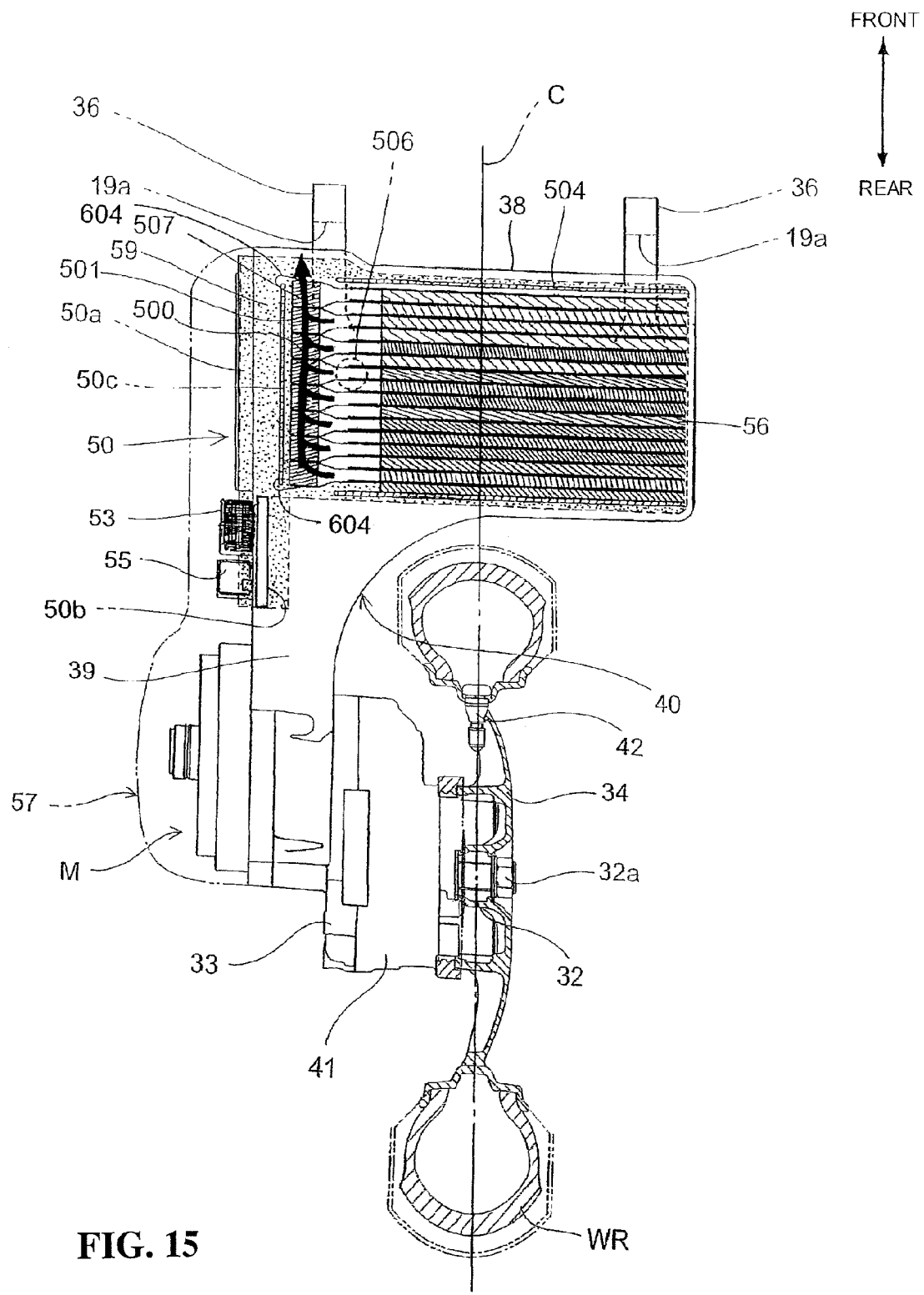
FIG. 15 is a top view of the swing arm showing a flow of gas exhausted from an explosion proof valve in the battery.
Figure 16:
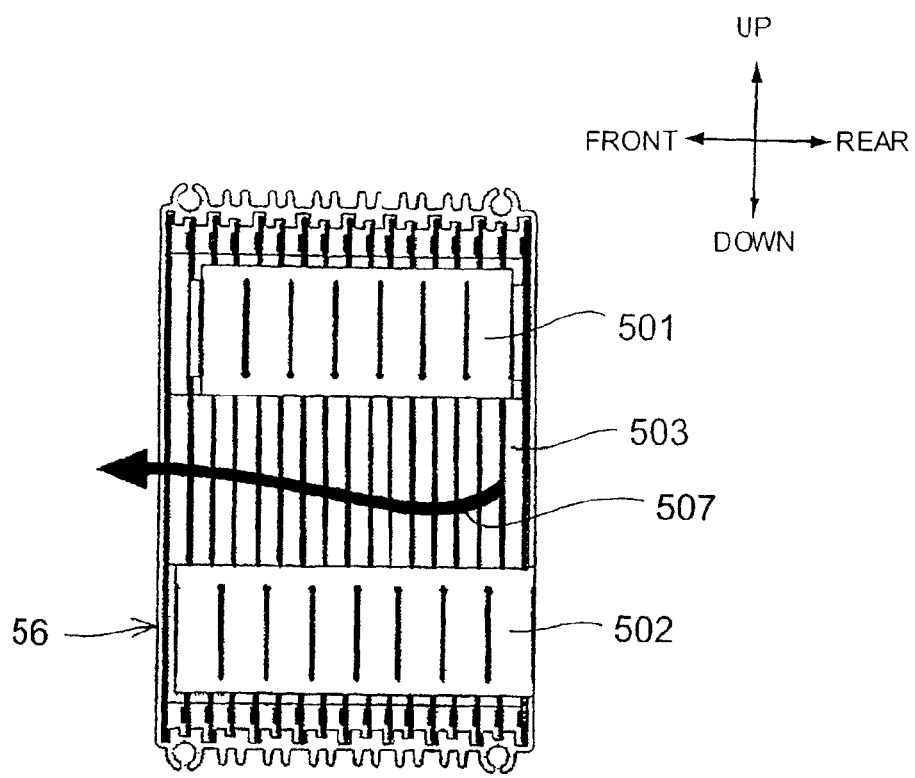
FIG. 16 is a front view of the battery showing a flow of gas exhausted from the explosion proof valve in the battery.

FIG. 15 is a top view showing a flow of gas 507 exhausted from the explosion proof valve 506 of the battery 56 in the swing arm 30. FIG. 16 is a front view showing the similar flow of gas 507 to that in FIG. 15 in the battery 56. The same reference numeral as the above-mentioned one denotes the same or the similar part.

As described above, the explosion proof valve 506 for preventing internal pressure from exceeding a predetermined value is provided in a position between the terminal on the minus side and the terminal on the plus side at a left end in the vehicle body of each battery cell (each laminated cell) 56a. The explosion proof valve 506 is formed in a part in which the laminated sheet is sealed to automatically open and remove gas when the internal pressure exceeds the predetermined value. The central sponge rubber 503 contributes to the reduction of the potting material and in addition, functions as a passage for exhausting gas 507 exhausted from the explosion proof valve 506 outside the swing arm 30. The gas 507 that passes the sponge rubber 503 is led on the front side of the vehicle body and is emitted outside via the through hole 38a formed in the wide case 38. Thus, the internal pressure of the swing arm 30 is prevented from being too high.

Figure 17:
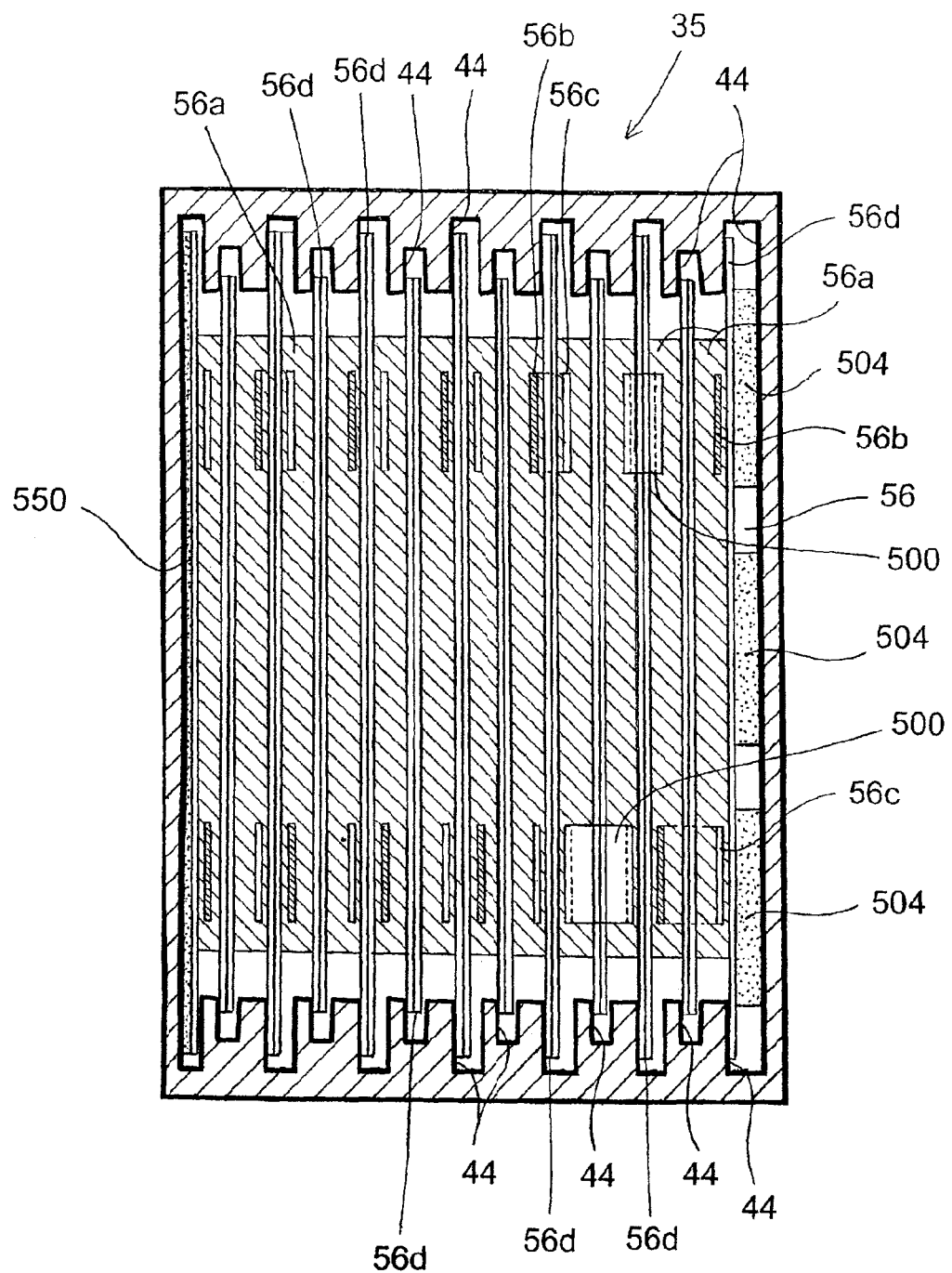
FIG. 17 is a front view showing the battery housed in the housing space and viewed from the housed side.

In this embodiment, third sponge rubber 504 is arranged between a surface on the front side in the vehicle body of the battery 56 and the internal wall on the front side in the vehicle body of the housing space 35 (see FIG. 15). More specifically, as shown in FIG. 17, the three rectangular third sponge rubbers 504 are arranged between the surface on the front side in the vehicle body of the battery and the internal wall on the front side in the vehicle body of the housing space 35 (on the side of the positive electrode) and a rectangular rubber sheet 550 is arranged between the surface on the rear side in the vehicle body of the battery and the internal wall on the rear side in the vehicle body of the housing space 35 (on the side of the negative electrode). In FIG. 17, the same reference numeral is allocated to the same configuration as that in FIG. 5.

Each third sponge rubber 504 is assembled in a compressed state and pressure that presses the surface on the front side in the vehicle body of the battery 56 on the rear side of the vehicle body is generated. Hereby, not only the use of the potting material can be reduced by the used quantity of the third sponge rubber 504 but the battery cell (the laminated cell) 56a is stably fixed because the fin 56d of each battery cell (each laminated cell) 56a is pressed on a side wall of the guide groove 44. Heat caused by the battery cell (the laminated cell) 56a is easily transmitted to the internal wall of the housing space 35. Thus, the heat radiation of the battery 56 is enhanced.

As described above, according to the battery module holding structure of the electric motorcycle according to the present invention, as the potting material is injected into each circumference of the control board and the battery so as to fix the battery after the sponge rubber is arranged between one side of the battery housed in the housing space formed in the swing arm and the control board arranged close to the battery, the fixing of the battery and the potting process for the control board are enabled, reducing the potting material by the quantity of the volume of the sponge rubber and lightening the swing arm.

The shape, the structure and others of the electric motorcycle, the swing arm, the board, the battery and the sponge rubber are not limited to the embodiment and various changes are allowed. The battery module holding structure according to the present invention is not limited to an electric motorcycle and can be applied to various electric vehicles and others such as saddle-ride type three-/four-wheeled vehicles.

The control unit 50 is configured by a control board 50a, a heating element board 50b and an aluminum board 50c and sponge rubber 501 having predetermined thickness is arranged between the battery 56 and the aluminum board 50c. A plurality of slits for inserting a plate-like terminal provided at a left end shown in FIG. 3 of each battery cell are formed in the sponge rubber 501. A position of the plate-like terminal is specified by inserting the plate-like terminal 500 into each slit. In addition, according to the sponge rubber 501, the used quantity of potting material 59 in a potting process described later is reduced and the weight of the swing arm 30 can be reduced. The aluminum board 50c is arranged close to the sponge rubber 501.

Elements that hardly heat for a control signal are mounted on the control board 50a. Elements in which large current flows and which heat up are mounted on the heating element board 50b and on the aluminum board 50c. Out of the elements that heat up, a thermistor 51, a group of input-output filters 52 for a battery charger, an inductor 53 for improving a battery charger power factor, a capacitor 54 for improving the battery charger power factor, a smoothing capacitor 55 for outputting DC and others the heat capacity of which is respectively large are mounted on the heating element board 50b. Out of the elements that heat up, electronic components the heat capacity of which is small are mounted on the aluminum board 50c.

Next, the detailed structure of the aluminum board 50c which is control circuitry for the electric vehicle according to the present invention will be described referring to FIGS. 18 to 24.

Figure 18:
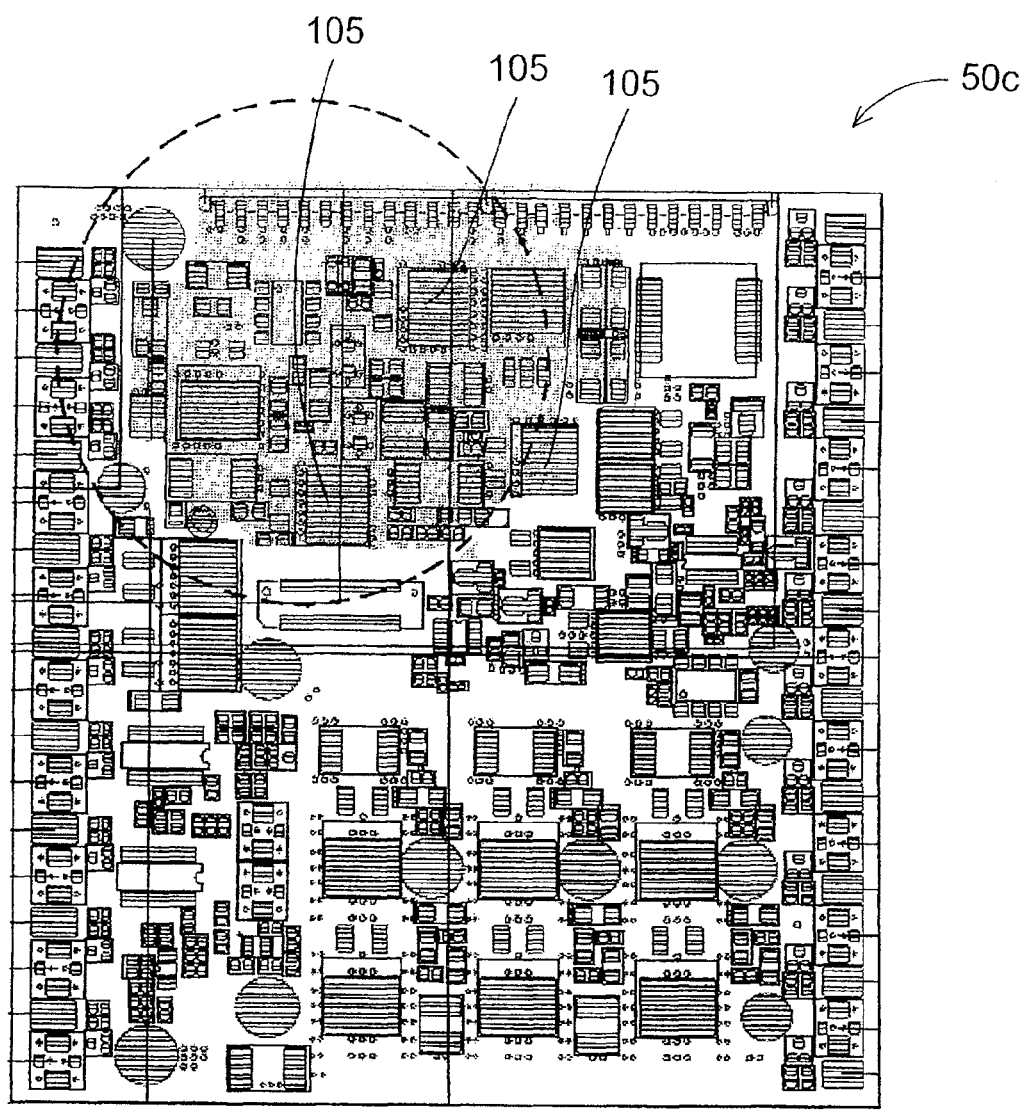
FIG. 18 is a plan view showing a control circuit for the electric vehicle (an aluminum board) according to the present invention.

FIG. 18 is a top view showing the whole aluminum board 50c and plural FETs (heating elements) 105 are mounted in a desired position.

Figure 19A:
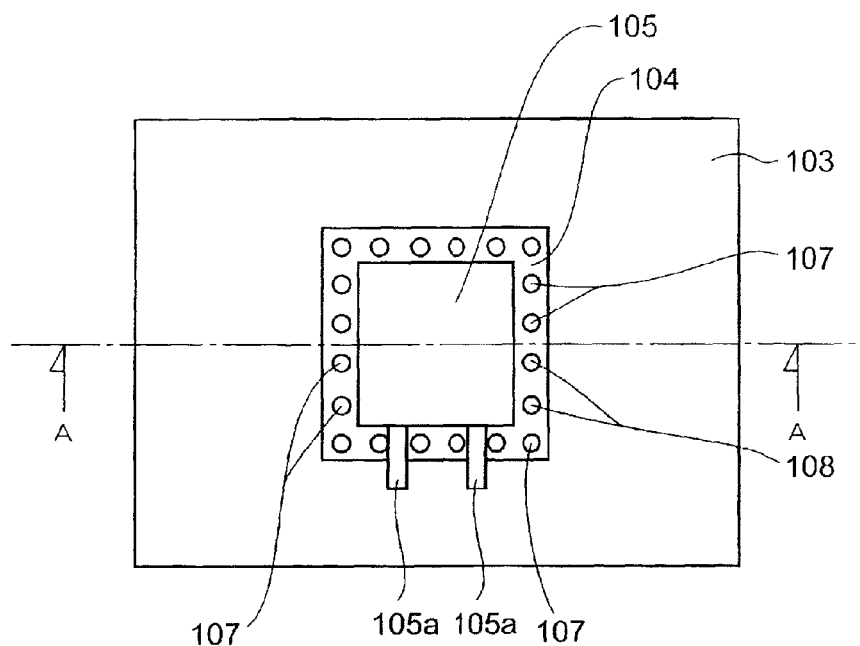
FIGS. 19(a) and 19(b) show a part in which a heating element is mounted in the control circuit for the electric vehicle.
Figure 19B:
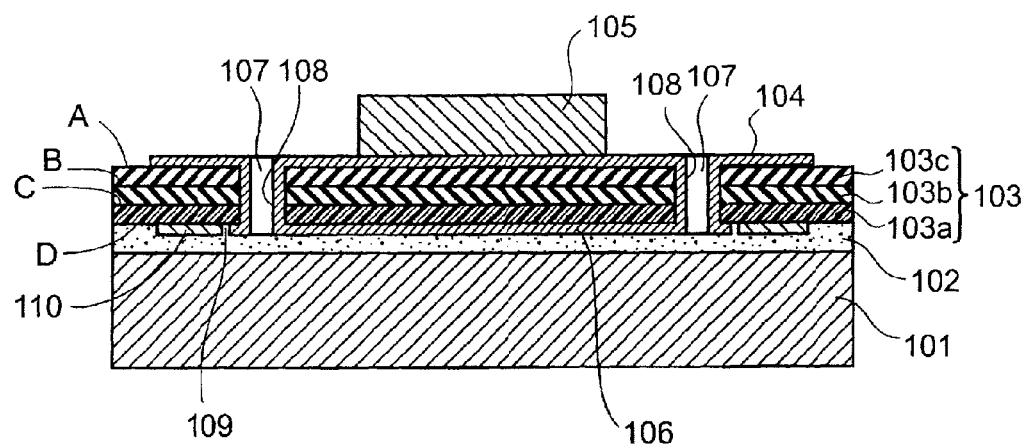

A part of the control circuitry for the electric vehicle which is shown in FIG. 18 and which includes the heating elements is mounted on a wiring board 103 laminated over a board 101 that radiates heat via an insulating adhesive 102 as shown in FIGS. 19(a) and 19(b). The wiring board 103 is configured by laminating a plurality of (three) wiring boards 103a, 103b, 103c on each of which wiring is formed. The board 101 that radiates heat is made of a satisfactory conductive member, for example, an aluminum board.

A first heat-conduction member 104 is formed on a top face of the wiring board 103c as the uppermost board of the wiring board 3 and a plurality of FETs (plural semiconductor elements) 105 are mounted on the first heat-conduction member. A terminal 105a is provided for fixing the FET (the semiconductor element) 105 onto the top face of the wiring board 103c.

In addition, a second heat-conduction member 106 is formed under the wiring board 103a as the lowermost board. Each wiring board is made of glass epoxy resin, and the first heat-conduction member 104 and the second heat-conduction member 106 are formed by heat-conductive and conductive copper foil plated on/under the glass epoxy resin of a desired pattern.

The first heat-conduction member 104 and the second heat-conduction member 106 are touched via a third heat-conduction member 108 arranged in a through hole 107 which is bored through each wiring board 103. The third heat-conduction member 108 is formed along an inside face of the hole by applying copper plating to the circumferential wall of the through hole 107.

The second heat-conduction member 106 is formed in the shape of a rectangular island including a part corresponding to a position in which the heating element 105 is mounted on the upside of the wiring board 103c on the downside of the wiring board 103a and a surrounding part 110 that surrounds a circumference of an island part is formed beyond a slit 109. The surrounding part (110) is kept at ground potential by being grounded.

According to this configuration, when the first heat-conduction member 104, the second heat-conduction member 106 and the third heat-conduction member 108 function as wiring and current flows there, creepage distance to insulation material for preventing the short circuit of the side of the first heat-conduction member 104 and the second heat-conduction member 106 can be secured because the surrounding part 110 that surrounds the island part of the second heat-conduction member 106 beyond the slit 109 exists and is kept at ground potential.

In addition, the surrounding part 110 can inhibit an effect on another component by preventing heat transfer from the heating element 105 from being horizontally transmitted.

Figure 20:
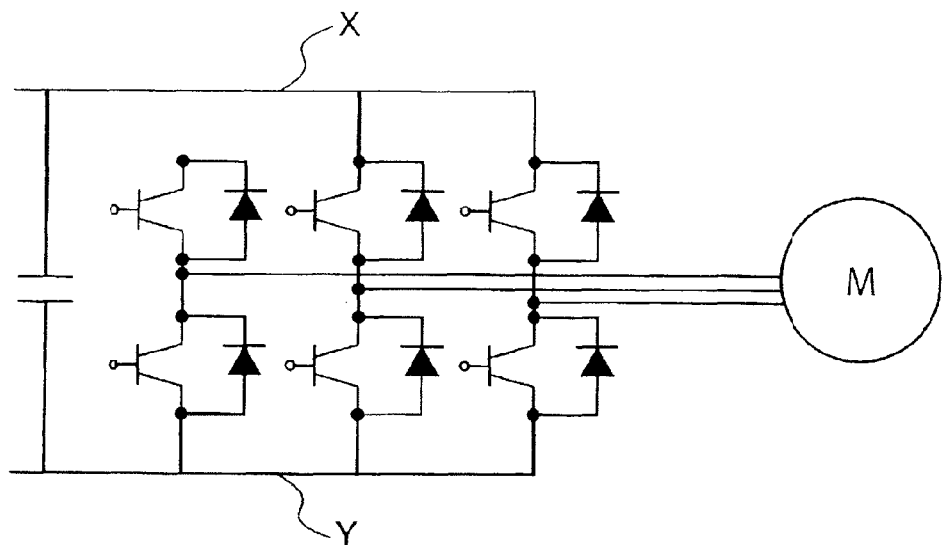
FIG. 20 is a simplified equivalent circuit diagram showing the control circuit for the electric vehicle (the aluminum board) for driving the motor.

FIG. 20 shows a simplified equivalent circuit for driving the motor M of the control circuitry (the aluminum board) for the electric vehicle, power supply voltage is supplied via a power supply line by executing the on-off control of each semiconductor element, and the motor M is driven. In this case, wiring X which is the plus side of the power supply line is formed by copper foil on the same surface as the first heat-conduction member 104 arranged on the top face of the wiring board 103c and is connected to the first heat-conduction member 104.

Further, wiring Y which is the minus side of the power supply line is formed by copper foil on the same surface as the surrounding part 110 and the second heat-conduction member 106 respectively arranged on the downside of the wiring board 103a, and the surrounding part 110 and the second heat-conduction member 106 are grounded. The wiring X and the wiring Y are connected by the third heat-conduction member 108 arranged in the through hole 107 and driving current flows in a vertical direction of the wiring board by functioning as electric connection and a passage for heat radiation.

Accordingly, as for the wiring X and the wiring Y, creepage distance to insulation material for preventing the short circuit of the wiring X and the wiring Y can be secured because the surrounding part 110 provided with the slit 109 exists.

An inductance component by wiring can be reduced by forming the power supply line on layers of different wiring boards and arranging them opposite on the two layers. Further, the capacity of a smoothing capacitor mounted on the wiring board can be also reduced by reducing the inductance component and area required by the wiring board can be also reduced.

The wiring board 103 shown in FIGS. 19(a) and 19(b) is configured by the three boards, however, the wiring board is configured by four layers as the sides where wiring and heat-conduction members are formed, that is, the component side (the power supply line side) A equivalent to the top face of the wiring board 103e, the signal wire side B equivalent to a top face of the wiring board 103b, the signal wire side C equivalent to a top face of the wiring board 103a and the heat radiation side (the grounding conductor side) D equivalent to the bottom of the wiring board 103a. FIGS. 21 to 24 show the component side A, the signal wire side B, the signal wire side C and the heat radiation side D respectively including a part (the same part on the upside and on the downside of the wiring board 103) in FIGS. 19(a) and 19(b).

Figure 21:
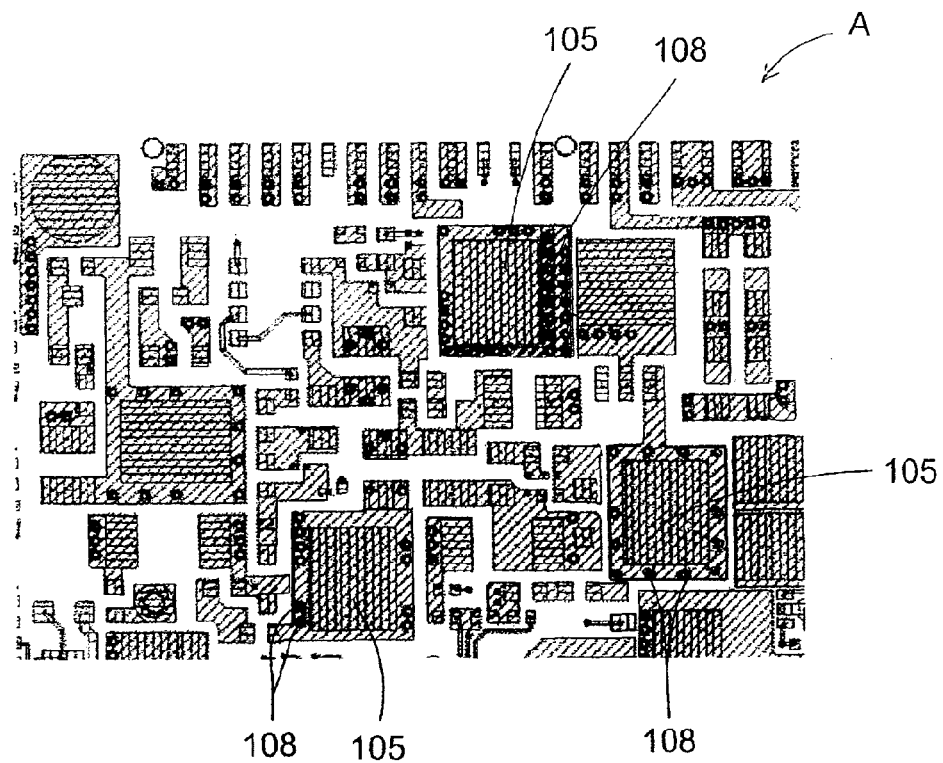
FIG. 21 is a plan view showing a part of the component side A of the control circuit for the electric vehicle shown in FIG. 20.

The component side (the first layer) A shown in FIG. 21 is equivalent to a part in FIG. 18 (substantially equivalent to a part in a circle shown in FIG. 18) and heating elements 105 are mounted on the rectangular first heat-conduction member 104 a size larger by than the heating element 105. The plurality of circular third heat-conduction members 108 are formed by plating the wall of each through hole 107 in suitable positions around the heating element on the first heat-conduction member 104.

Figure 22:
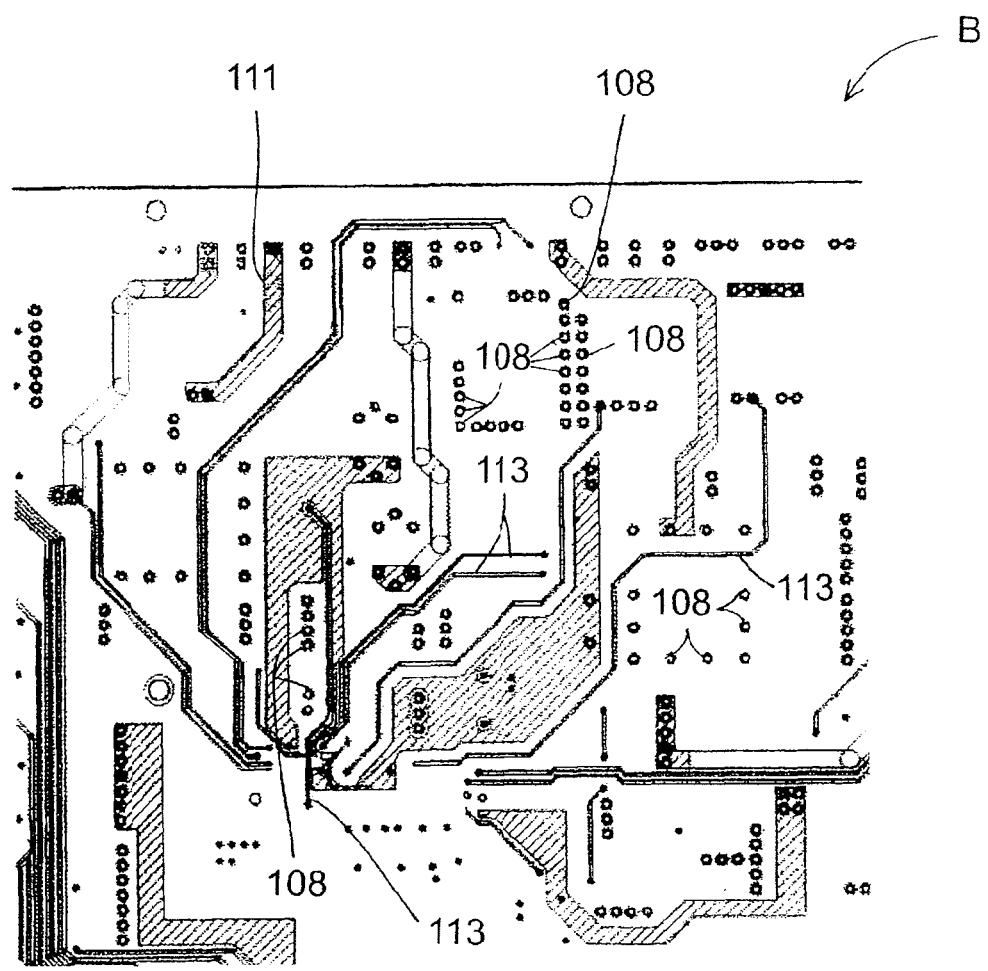
FIG. 22 is a plan view showing a part of the signal wire side B corresponding to FIG. 21 of the control circuit for the electric vehicle.

On the signal wire side (on the side of the second layer) B shown in FIG. 22, the third heat-conduction member 108 is formed in a position corresponding to the third heat-conduction member 108 on the component side (on the side of the first layer) A.

Figure 23:
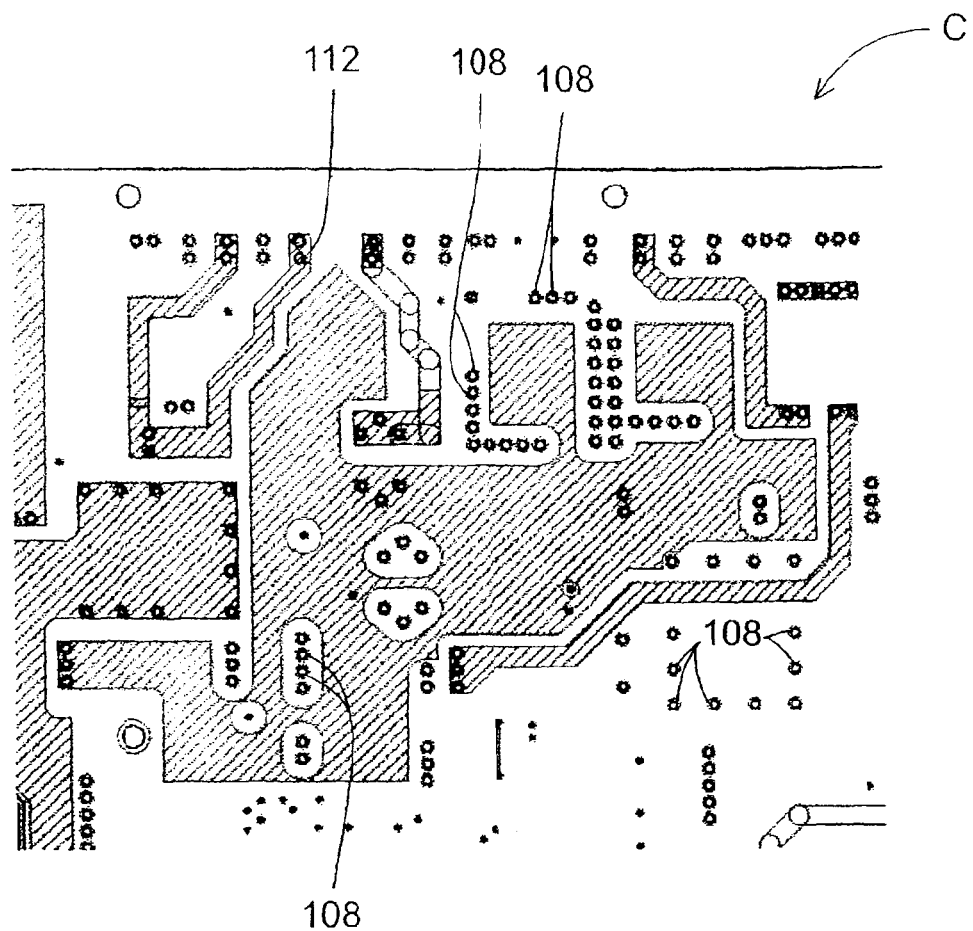
FIG. 23 is a plan view showing a part of the signal wire side C corresponding to FIG. 22 of the control circuit for the electric vehicle.

On the signal wire side (on the side of the third layer) C shown in FIG. 23, the third heat-conduction member 108 is formed in a position corresponding to the third heat-conduction member 108 on the component side (on the side of the first layer) A like the signal wire side (the second layer) B.

On the signal wire side (on the second layer) B shown in FIG. 22, for example, an output wiring pattern on the plus side 111 of a transformer on the secondary side is formed and on the signal wire side (on the third layer) C shown in FIG. 23, an output wiring pattern on the minus side 112 of the transformer on the secondary side is formed. The wiring patterns are brought close owing to the configuration that the wiring patterns 111, 112 are arranged vertically opposite and an inductance component by a loop can be reduced.

In addition, on the signal wire side (on the second layer) B, signal wire 113 for controlling FET is formed. As no power supply current flows on the same plane as the signal wire 113 by arranging the signal wire 113 at a light angle (a direction of a paper surface in FIG. 22) to a direction in which current flows (a direction to the back in FIG. 22) in the power supply line (wiring X, Y). Thus, the effect of the power supply line is reduced and the effect of noise can be reduced.

Figure 24:
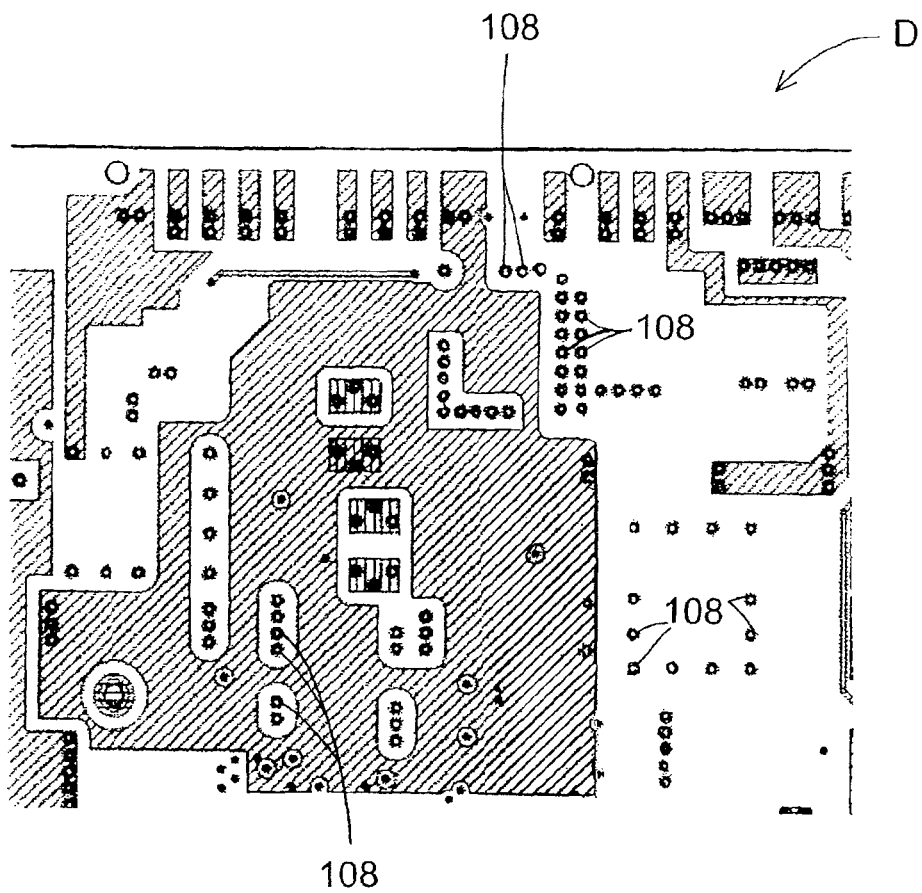
FIG. 24 is a plan view showing a part of the heat radiation side D corresponding to FIG. 23 of the control circuit for the electric vehicle.

On the heat radiation side (on the fourth layer) D shown in FIG. 24, the second heat-conduction member 106 touched to the board 101 that radiates heat (the aluminum board) via insulating resin is formed. In addition, like the signal wire side (the second layer) B, the third heat-conduction member 108 is formed in a position corresponding to the third heat-conduction member 108 on the component side (on the side of the first layer) A.

According to the above-mentioned configuration, when heat is generated from the heating element 105, the generated heat is radiated from its top face by the first heat-conduction member 104, the heat of the first heat-conduction member 104 is transmitted in the third heat-conduction member 108 arranged in the through hole 107, is led to the second heat-conduction member 106, is transmitted to the board 101 that radiates heat via the insulating adhesive 102 from the second heat-conduction member 106, and is positively radiated from the bottom of the board 101 that radiates heat.

As a result, heat generated from the heating element 105 can be efficiently radiated in plural directions (from the top face and from the bottom).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery for an electric vehicle for supplying electric power to an electric motor that drives a driving wheel of the electric vehicle, comprising:
    a board connected to the battery configured as an aggregate of a plurality of battery cells;
    each battery cell is provided with a positive electrode and a negative electrode respectively connected to the board;
    a plurality of cell connecting parts disposed on the board for collecting each cell information corresponding to the electrodes of each cell beforehand independent of the number of battery cells;
    a plurality of plate terminals, each of the plate terminals directly connecting the positive electrode of one of two immediate adjacent battery cells and the negative electrode of the other one of the two immediate adjacent battery cells, two immediate adjacent battery cells being electrically connected in series and located on a same side of the board; and
    sensor wirings respectively connecting the plate terminals and the corresponding cell connecting parts on the board.

2. The battery for the electric vehicle according to claim 1, wherein each output wiring connecting part for connecting to each output wiring from the positive electrode and the negative electrode respectively located at each end of the aggregate when each battery cell is connected in series is provided to the board.

3. The battery for the electric vehicle according to claim 1, wherein a control unit in which components of a control circuit for controlling the electric motor are arranged and a control unit in which components of a charging circuit for charging the battery cell are arranged are provided in the vicinity of the board, and a power module is configured by integrating the board and the control units.

4. The battery for the electric vehicle according to claim 3, wherein the power module is configured by the control board that mainly controls the electric motor, a heating element board provided with the charging circuit that mainly charges the battery cell and the board, and the cell connecting parts of the board are connected to the control board.

5. The battery for the electric vehicle according to claim 1, wherein the battery cell is a laminated battery cell packaged for each cell.

6. A battery for an electric vehicle for supplying electric power to an electric motor that drives a driving wheel of the electric vehicle, comprising:
    a board connected to the battery configured as an aggregate of a plurality of battery cells;
    each battery cell is provided with a positive electrode and a negative electrode respectively connected to a side of the board;
    a plurality of cell connecting parts disposed on the board for collecting each cell information corresponding to the electrodes of each cell beforehand independent of the number of battery cells; and
    sensor wiring connecting the board and each electrode of each cell by the number of each battery cell on the cell connecting part;
    wherein the battery cell is a laminated battery cell packaged for each cell, and
    wherein a foamed body is interposed between the aggregate of the battery cells and the board, and housed in a housing space provided to a swing arm that supports the driving wheel, and the battery cells and a power module including the board are integrally connected by flowable resin potted in the housing space.

7. A battery adapted to be used with an electric vehicle, comprising:
    a plurality of battery cells wherein each battery cell is provided with a positive electrode and a negative electrode, respectively;
    a board operatively connected to the positive electrodes and negative electrodes of each of the plurality of battery cells;
    a plurality of cell connecting parts disposed on the board for collecting each cell information corresponding to the electrodes of each cell beforehand independent of the number of battery cells;
    a plurality of plate terminals, each of the plate terminals directly connecting the positive electrode of one of two immediate adjacent battery cells and the negative electrode of the other one of the two immediate adjacent battery cells, two immediate adjacent battery cells being electrically connected in series and located on a same side of the board; and
    sensor wirings respectively connecting the plate terminals and the corresponding cell connecting parts on the board.

8. The battery adapted to be used with an electric vehicle according to claim 7, wherein each output wiring connecting part for connecting to each output wiring from the positive electrode and the negative electrode respectively located at each end of the aggregate when each battery cell is connected in series is provided to the board.

9. The battery adapted to be used with an electric vehicle according to claim 7, wherein a control unit in which components of a control circuit for controlling the electric motor are arranged and a control unit in which components of a charging circuit for charging the battery cell are arranged are provided in the vicinity of the board, and a power module is configured by integrating the board and the control units.

10. The battery adapted to be used with an electric vehicle according to claim 9, wherein the power module is configured by the control board that mainly controls the electric motor, a heating element board provided with the charging circuit that mainly charges the battery cell and the board, and the cell connecting parts of the board are connected to the control board.

11. A battery adapted to be used with an electric vehicle, comprising:
- a plurality of battery cells wherein each battery cell is provided with a positive electrode and a negative electrode, respectively;
- a board operatively connected to the positive electrodes and negative electrodes of each of the plurality of battery cells;
- a plurality of cell connecting parts disposed on the board for collecting each cell information corresponding to the electrodes of each cell beforehand independent of the number of battery cells; and
- sensor wiring connecting the board and each electrode of each cell by the number of each battery cell on the cell connecting part;
- a control circuit for the electric vehicle where a plurality of wiring boards on each of which wiring is formed are laminated over a heat radiation board that radiates heat via an insulating adhesive;
- a heating element mounted on a first heat-conduction member formed on a top face of an uppermost wiring board of the wiring boards;
- a second heat-conduction member formed on a downside of a lowermost wiring board of the wiring boards; and
- the first heat-conduction member and the second heat-conduction member are touched via a third heat-conduction member arranged in a through hole bored through each wiring board.

12. The battery for the electric vehicle according to claim 11, wherein the second heat-conduction member is formed in the shape of an island including a part corresponding to a position in which the heating element is mounted, a surrounding part for surrounding a circumference of an island part is formed beyond a slit, and the surrounding part is grounded.

13. The battery for the electric vehicle according to claim 11, wherein the wiring boards are provided with a power supply line that supplies power;
- one side of the power supply line is formed on a top face of the uppermost wiring board, the other side of the power supply line is formed at a bottom of the lowermost wiring board, and a signal wire is formed on an intermediate layer.

14. The battery for the electric vehicle according to claim 13, wherein the heating element is a semiconductor element and the wiring boards are provided with the signal wire for controlling the semiconductor element; and
- the signal wire is arranged at a right angle, in a horizontal direction to the wiring boards, with a direction in which current flows in the power supply line, a direction of upper and lower layers of the wiring boards.

15. The battery for the electric vehicle according to claim 11, wherein the electric vehicle is an electric vehicle where one end of a swing arm is swingably journaled to a vehicle body and a rear wheel is driven by an electric motor provided to the other end, the control circuit is arranged in the swing arm, and the control circuit is arranged on the front side of the electric motor in a longitudinal direction of the vehicle.

16. The battery for the electric vehicle according to claim 11, wherein the control circuit is a control unit provided with a plurality of boards, the control unit is configured by a control board on which elements for a control signal are mounted, a heating element board on which heating elements are mounted and an aluminum board, and the control board is configured by the plurality of wiring boards.

17. The battery for the electric vehicle according to claim 12, wherein the control circuit is a control unit provided with a plurality of boards, the control unit is configured by a control board on which elements for a control signal are mounted, a heating element board on which heating elements are mounted and an aluminum board, and the control board is configured by the plurality of wiring boards.

18. The battery for the electric vehicle according to claim 13, wherein the control circuit is a control unit provided with a plurality of boards, the control unit is configured by a control board on which elements for a control signal are mounted, a heating element board on which heating elements are mounted and an aluminum board, and the control board is configured by the plurality of wiring boards.

19. The battery for the electric vehicle according to claim 14, wherein the control circuit is a control unit provided with a plurality of boards, the control unit is configured by a control board on which elements for a control signal are mounted, a heating element board on which heating elements are mounted and an aluminum board, and the control board is configured by the plurality of wiring boards.

20. The battery for the electric vehicle according to claim 16, wherein the control board is arranged on a front side of the heating element board in the longitudinal direction of the vehicle.

* * * * *